(12) United States Patent
Hara

(10) Patent No.: US 10,098,115 B2
(45) Date of Patent: Oct. 9, 2018

(54) MOBILE COMMUNICATION APPARATUS AND RADIO COMMUNICATION METHOD

(71) Applicant: FUJITSU LIMITED, Kawasaki-shi, Kanagawa (JP)

(72) Inventor: Yasushi Hara, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 14/743,129

(22) Filed: Jun. 18, 2015

(65) Prior Publication Data

US 2015/0382348 A1   Dec. 31, 2015

(30) Foreign Application Priority Data

Jun. 30, 2014   (JP) ................................. 2014-135094

(51) Int. Cl.
| | | |
|---|---|---|
| *H04W 72/04* | (2009.01) | |
| *H04W 88/10* | (2009.01) | |
| *H04W 88/06* | (2009.01) | |
| *H04W 84/02* | (2009.01) | |
| *H04W 36/00* | (2009.01) | |

(52) U.S. Cl.
CPC .... *H04W 72/0453* (2013.01); *H04W 36/0088* (2013.01); *H04W 84/02* (2013.01); *H04W 88/06* (2013.01); *H04W 88/10* (2013.01)

(58) Field of Classification Search
CPC ................................................ H04W 72/0453
See application file for complete search history.

(56) References Cited

U.S. PATENT DOCUMENTS

| | | | |
|---|---|---|---|
| 2002/0032034 A1 | 3/2002 | Tiedemann, Jr. et al. | |
| 2006/0073827 A1* | 4/2006 | Vaisanen | H04W 36/0055 455/436 |
| 2012/0147777 A1 | 6/2012 | Arashin et al. | |
| 2013/0010719 A1* | 1/2013 | Shapira | H04W 72/082 370/329 |
| 2013/0235861 A1 | 9/2013 | Balasubramanian et al. | |
| 2016/0183174 A1* | 6/2016 | Xie | H04W 48/18 455/436 |

FOREIGN PATENT DOCUMENTS

| | | |
|---|---|---|
| JP | 2001-508625 | 6/2001 |
| JP | 2002-158667 | 5/2002 |
| JP | 2003-318920 | 11/2003 |

(Continued)

OTHER PUBLICATIONS

JPOA—Office Action dated Jan. 16, 2018 for the corresponding Japanese Application No. 2014-135094, with full machine translation.

*Primary Examiner* — Jason E Mattis
(74) *Attorney, Agent, or Firm* — Fujitsu Patent Center

(57) ABSTRACT

A radio communication unit performs communication using a first frequency band or a second frequency band. A control unit allows a connection to an access point in the first frequency band when a signal level of a received signal of the first frequency band which is received from the access point exceeds a first threshold. When the connection to the access point in the first frequency band is established and when the signal level exceeds a second threshold greater than the first threshold, the control unit starts a search for an access point in the second frequency band.

5 Claims, 22 Drawing Sheets

(56) References Cited

FOREIGN PATENT DOCUMENTS

| | | |
|---|---|---|
| JP | 2004-229225 | 8/2004 |
| JP | 2009-544245 | 12/2009 |
| JP | 2013-143624 | 7/2013 |
| WO | 2008/008987 | 1/2008 |
| WO | 2011/161951 | 12/2011 |
| WO | 2013/085610 A1 | 6/2013 |

\* cited by examiner

STORAGE UNIT

TIME INFORMATION TABLE 115

| 5GHz ESSID | DISCONNECTION TIME | 2.4GHz ESSID | CONNECTION TIME |
|---|---|---|---|
| EESID_10 | 20140401 10:21:30 | EESID_11 | 20140401 10:21:45 |

FIG. 19

MOBILE COMMUNICATION APPARATUS AND RADIO COMMUNICATION METHOD

CROSS-REFERENCE TO RELATED APPLICATION

This application is based upon and claims the benefit of priority of the prior Japanese Patent Application No. 2014-135094, filed on Jun. 30, 2014, the entire contents of which are incorporated herein by reference.

FIELD

The embodiments discussed herein are related to a mobile communication apparatus and a radio communication method.

BACKGROUND

Mobile communication apparatuses connectable to a wireless local area network (LAN) are used today. Such a mobile communication apparatus searches for (scans for), for example, an available nearby access point (base station) from among access points with air interfaces scattered over the wireless LAN. When a desired access point is detected, the mobile communication apparatus connects to the detected access point to perform communication.

The frequency band available for the wireless LAN includes the 2.4 GHz band and the 5 GHz band. In the 2.4 GHz band, 13 channels are defined, namely, channels 1 to 13. In the 5 GHz band, 19 channels are defined, namely, channels 36, 40, . . . , and 64, and channels 100, 104, . . . , and 140. In the case of using the 2.4 GHz band, the access point selects one or more channels in the 2.4 GHz band. In the case of using the 5 GHz band, the access point selects one or more channels in the 5 GHz band. There are cases in which a single access point uses both the 2.4 GHz band and the 5 GHz band.

When the mobile communication apparatus is not connected to any access point, the mobile communication apparatus searches for an access point by determining for each of the channels of the 2.4 GHz band and the 5 GHz band whether a signal in a predetermined format is received, for example. If an available access point is detected, the mobile communication apparatus performs connection processing to start communication using a channel of the 2.4 GHz band or the 5 GHz band on which the access point is detected.

There has been proposed a method that performs multiple iterations of scan. According to this scanning method, a radio communication apparatus selects passive scan or active scan for each scan, in accordance with the area where the radio communication apparatus is located. In passive scan, the radio communication apparatus detects a beacon that is periodically broadcasted by an access point. In active scan, the radio communication apparatus transmits a probe request, and detects a response to the probe request.

There has also been proposed an access point that selectively uses the 2.4 GHz band and the 5 GHz band. This access point causes a radio communication apparatus performing highly real-time communication to connect to the 5 GHz band where there is less interference than in the 2.4 GHz band, and causes another radio communication apparatus to connect to the 2.4 GHz band. The access point may cause a radio communication apparatus to perform "roaming" to move from the 5 GHz band to the 2.4 GHz band.

In the wireless LAN, the 5 GHz band has an advantage over the 2.4 GHz band. For example, although adjacent bands in the 2.4 GHz band overlap in the frequency domain, adjacent bands in the 5 GHz band do not overlap in the frequency domain. Accordingly, the 5 GHz band has less interference between channels. Further, the frequencies in the 5 GHz band have less conflict with electrical products, such as microwave ovens, and communication apparatuses of other communication systems. Further, according to some communication standards for wireless LAN, it is possible to realize faster radio communication by using the 5 GHz band than by using only the 2.4 GHz band.

See, for example, International Publication Pamphlets No. WO2008/008987, and No. WO2011/161951.

Radio areas of a plurality of frequency bands (for example, the 2.4 GHz band and the 5 GHz band) are sometimes formed to concentrically overlap each other. For example, in the case where one access point uses a plurality of frequency bands, radio areas of the plurality of frequency bands are formed around the access point. If a mobile communication apparatus starts a search in the vicinity of the access point, the mobile communication apparatus may connect to the access point in any of the frequency bands.

However, different frequency bands often have different sizes of radio areas. For instance, the propagation distance of a radio signal of the 2.4 GHz band is often greater than that of a radio signal of the 5 GHz band, and therefore the 2.4 GHz band often has a larger radio area than the 5 GHz band. Accordingly, in the case where a mobile communication apparatus moves toward an access point from a distant location, the mobile communication apparatus is likely to connect to the access point in a specific frequency band first (for example, a band of lower frequencies such as the 2.4 GHz band or the like). Then, if the connection is maintained as long as the radio conditions of the connected frequency band are good, the mobile communication apparatus will not have an opportunity to reconnect to the access point in another frequency band (for example, a band of higher frequencies such as the 5 GHz band or the like). Thus, even when a plurality of frequency bands are available, there is a variation between the frequency bands in how often the frequency bands are used.

One way to address this issue is to, even after a connection to an access point is established in a frequency band, continuously search for an access point in another frequency band, and perform reconnection when the radio conditions of the other frequency band are improved. However, continuous search in another frequency band imposes a high load on the mobile communication apparatus. For example, in the case where a connection is established in the 2.4 GHz band, communication in the 2.4 GHz band might be temporarily suspended in order to perform a search in the 5 GHz band.

SUMMARY

According to one aspect of the invention, there is provided a mobile communication apparatus that includes: a radio interface configured to perform communication using a first frequency band or a second frequency band; and a processor configured to perform a procedure including: allowing a connection to one access point in the first frequency band when a signal level of a received signal of the first frequency band which is received from the one access point exceeds a first threshold, and starting a search for an access point in the second frequency band when the connection to the one access point in the first frequency band is established and when the signal level exceeds a second threshold greater than the first threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 illustrates an example of a time information table;

DESCRIPTION OF EMBODIMENTS

Figure 1:
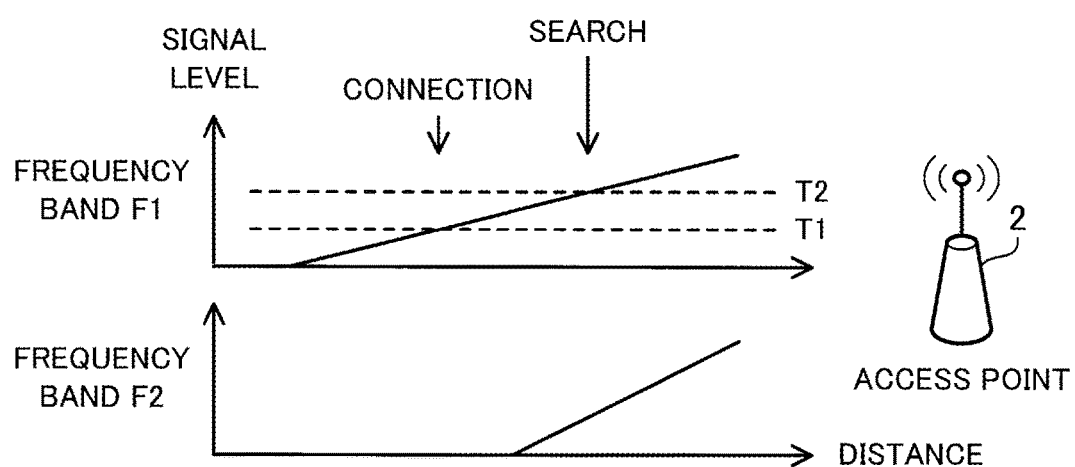
FIG. 1 illustrates a mobile communication apparatus according to a first embodiment.
Figure 1:
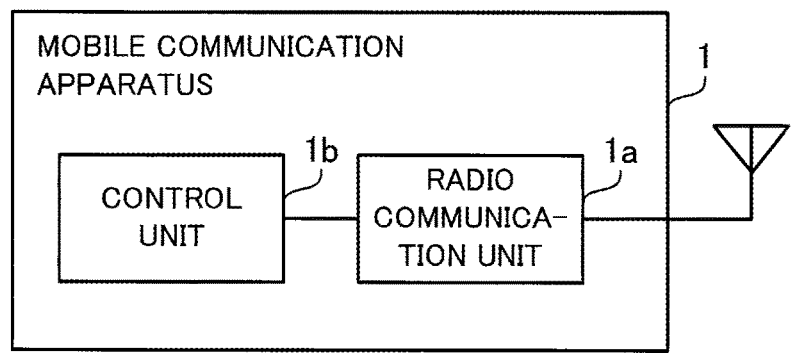

Several embodiments will be described below with reference to the accompanying drawings, wherein like reference numerals refer to like elements throughout.

(a) First Embodiment

FIG. 1 illustrates a mobile communication apparatus 1 according to a first embodiment.

The mobile communication apparatus 1 of the first embodiment is able to connect to an access point 2 and perform radio communication with the access point 2. The mobile communication apparatus 1 is, for example, a mobile radio terminal apparatus such as a mobile phone, a smartphone, a personal digital assistant (PDA), a tablet terminal, and the like. The access point 2 is, for example, a radio communication apparatus belonging to a wireless LAN, and is often called a "base station". The access point 2 includes a radio interface that communicates wirelessly with the mobile communication apparatus 1, and a wired interface or another radio interface that communicates with a higher-level network. The access point 2 relays data for the mobile communication apparatus 1.

The mobile communication apparatus 1 includes a radio communication unit 1a and a control unit 1b.

The radio communication unit 1a is able to search for an access point in a frequency band F1, and perform communication using the frequency band F1. The radio communication unit 1a is also able to search for an access point in a frequency band F2, and perform communication using the frequency band F2. A search for an access point is often referred to as a "scan". The access point 2 uses both the frequency band F1 and the frequency band F2. Accordingly, the access point 2 is detected in both the search of the frequency band F1 and the search of the frequency band F2. Note that, in place of the access point 2, an access point that uses the frequency band F1 and an access point that uses the frequency band F2 may be provided in pair (close to each other).

The frequency band F2 may be a band of higher frequencies than the frequency band F1. For example, the frequency band F1 is the 2.4 GHz band, and the frequency band F2 is the 5 GHz band. A radio signal transmitted in the frequency band F1 from the access point 2 propagates a longer distance than a radio signal transmitted in the frequency band F2 from the access point 2. Therefore, in the case where the mobile communication apparatus 1 moves toward the access point 2 from the outside of the coverage area of the access point 2, the access point 2 is likely to be detected in the frequency band F1 before being detected in the frequency band F2.

The control unit 1b controls the timing of a search for an access point by the radio communication unit 1a, and controls connection to an access point detected by the search. The control unit 1b may include a processor such as a central processing unit (CPU), a digital signal processor (DSP), and the like. Further, the control unit 1b may include an application specific electronic circuit such as an application specific integrated circuit (ASIC), a field programmable gate array (FPGA), and the like. The processor executes a communication control program stored in a storage device such as a random access memory (RAM), a flash memory, and the like, for example. Note that a set of multiple processors (a multiprocessor) may be referred to as a "processor".

When the mobile communication apparatus 1 is not connected to any access point, the control unit 1b causes the radio communication unit 1a to search for an access point. When a search for an access point is performed, the control unit 1b acquires the search result from the radio communication unit 1a. The search result includes information indicating a detected access point, and information indicating the measured signal level of a received signal (for example, received signal strength). The information indicating an access point may be, for example, an extended service set identifier (ESSID) or a basic service set identifier (BSSID). The information indicating the received signal strength may be, for example, a received signal strength indicator (RSSI).

When the access point 2 is detected in the frequency band F1, the control unit 1b compares the signal level of a signal of the frequency band F1 received from the access point 2 with a threshold T1. The threshold T1 is −80 dBm, for example. When the signal level of the frequency band F1 exceeds the threshold T1, the control unit 1b allows a connection to the access point 2 in the frequency band F1.

Then, when a connection to the access point 2 is established in the frequency band F1, the control unit 1b monitors the signal level of the signal of the frequency band F1 received from the access point 2, and compares the signal level with a threshold T2. The threshold T2 has a value greater than the threshold T1, and is −60 dBm, for example. While the signal level of the frequency band F1 is less than or equal to the threshold T2, the control unit 1b does not need to cause the radio communication unit 1a to search for an access point in the frequency band F2. On the other hand, when the signal level of the frequency band F1 exceeds the threshold T2, the control unit 1b causes the radio communication unit 1a to start a search of the frequency band F2.

As mentioned above, the radio area of the frequency band F2 might be smaller than that of the frequency band F1. Therefore, even if the signal level of the frequency band F1 exceeds the threshold T1, the access point 2 might not be detected yet when a search of the frequency band F2 is performed (the mobile communication apparatus 1 might be outside the radio area of the frequency band F2). On the other hand, if the signal level of the frequency band F1 exceeds the threshold T2, the mobile communication apparatus 1 is sufficiently close to the access point 2. Thus, the access point 2 is likely to be detected in the frequency band F2 when a search of the frequency band F2 is performed.

In the above description, the start conditions for starting a search of the frequency band F2 are: a connection to the access point 2 is established in the frequency band F1; and the signal level of the frequency band F1 exceeds the threshold T2. However, the start conditions may include other conditions than these conditions. For example, the start conditions may include a condition that the access point 2 is registered in access point information held in the mobile communication apparatus 1. The access point information indicates an access point that uses both the frequency band F1 and the frequency band F2. That is, the control unit 1b may start a search of the frequency band F2 only when a connection to the access point 2 is established in the frequency band F1 and when it is known that the access point 2 also uses the frequency band F2. In the access point information, ESSID or BSSID may be used as information for identifying an access point.

According to the mobile communication apparatus of the first embodiment, when a connection to the access point 2 is established in the frequency band F1 and when the signal level of the frequency band F1 exceeds the threshold T2 that is greater than the threshold T1, a search of the frequency band F2 may be started. Thus, even if a connection to the access point 2 has already been established in the frequency band F1, it is possible to detect the access point 2 in the frequency band F2, and thus to have an opportunity to reconnect to the access point 2 in the frequency band F2. Accordingly, even when the radio area of the frequency band F2 is smaller than that of the frequency band F1, such as when the frequencies of the frequency band F2 are higher than those of the frequency band F1, it is possible to utilize the frequency band F2.

Further, if the signal level of the frequency band F1 is less than or equal to the threshold T2, the access point 2 is not likely to be detected in the frequency band F2. On the other hand, if the signal level of the frequency band F1 exceeds the threshold T2, the access point 2 is likely to be detected in the frequency band F2. Thus, according to the first embodiment, it is possible to start a scan of the frequency band F2 after the likelihood of the access point 2 being detected in the frequency band F2 is increased. Therefore, the load on the mobile communication apparatus 1 to search for an access point may be reduced.

(b) Second Embodiment

Figure 2:
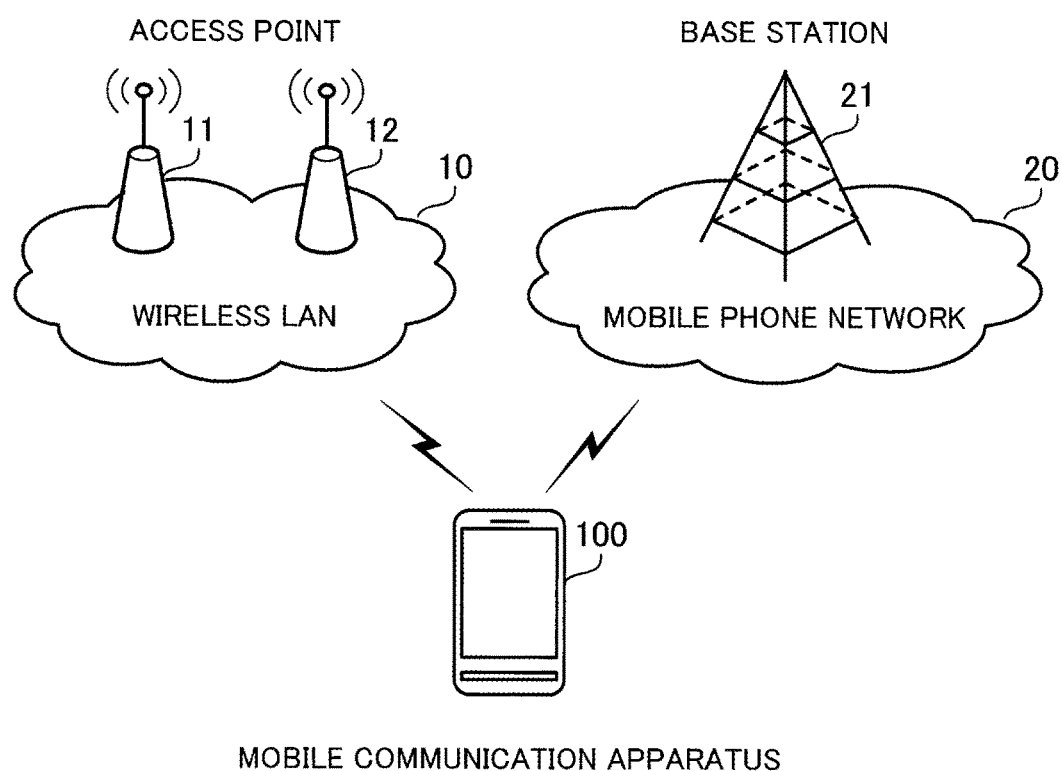
FIG. 2 illustrates a mobile communication system according to a second embodiment.

FIG. 2 illustrates a mobile communication system according to a second embodiment.

The mobile communication system of the second embodiment includes a wireless LAN 10, a mobile phone network 20, and a mobile communication apparatus 100. The wireless LAN 10 includes a plurality of access points including access points 11 and 12. The mobile phone network 20 includes a plurality of base stations including a base station 21. Note that the mobile communication apparatus 100 is an example of the mobile communication apparatus 1 of the first embodiment. The access point 11 is an example of the access point 2 of the first embodiment.

The access points 11 and 12 are radio communication apparatuses that perform radio communication conforming to the Institute of Electrical and Electronics Engineers (IEEE) 802.11 series of standards. The access points 11 and 12 are often called "base stations". Examples of standards to be conformed to may include the IEEE802.11g, the IEEE802.11n, the IEEE802.11ac, and so on. The radio communication may conform to Wi-Fi. The access points 11 and 12 locally cover a part of the radio area of the mobile phone network 20. In other words, the radio areas of the wireless LAN 10 are distributed in the radio area of the mobile phone network 20. The access points 11 and 12 are connected to a wired network, and relay data between the mobile communication apparatus 100 and the wired network. For example, the access points 11 and 12 are connected to a data communication network that performs data communication using the Internet Protocol (IP).

The base station 21 is a radio communication apparatus that performs radio communication confirming to the 3rd Generation Partnership Project (3GPP) standards. Examples of standards to be conformed to may include Wideband Code Division Multiple Access (W-CDMA), Long Term Evolution (LTE), and so on. The base station 21 covers a wide radio area including the radio areas of the wireless LAN 10. The base station 21 may be regarded to form a macrocell. The base station 21 is connected to a wired network, and relays data between the mobile communication apparatus 100 and the wired network. For example, the base station 21 is connected to the data communication network to which the access points 11 and 12 are connected.

The mobile communication apparatus 100 is a mobile radio communication apparatus that includes both a radio interface using the wireless LAN 10 and a radio interface using the mobile phone network 20. The mobile communication apparatus 100 may be a user terminal apparatus operated by the user, such as a mobile phone, a smartphone, a PDA, a tablet terminal, and the like, for example. The mobile communication apparatus 100 is able to access a server apparatus on the data communication network via the wireless LAN 10 or the mobile phone network 20, and receive data such as Web pages, images, and videos.

For example, the mobile communication apparatus 100 receives data from the data communication network via the base station 21. However, upon entering the radio area of the access point 11, the mobile communication apparatus 100 connects to the access point 11, and receives data from the data communication network via the access point 11 instead of the base station 21. Similarly, upon entering the radio area of the access point 12, the mobile communication apparatus 100 connects to the access point 12, and receives data from the data communication network via the access point 12 instead of the base station 21. That is, when the mobile communication apparatus 100 is able to use the wireless LAN 10, the mobile communication apparatus 100 uses the wireless LAN 10 preferentially.

Note that each access point is assigned a BSSID and an ESSID as identification information. The BSSID is a 48-bit number for physically identifying each access point, and usually uses the medium access control (MAC) address of the access point. The ESSID is a string of a maximum of 32 alphanumeric characters for logically identifying a set of one or more access points. For example, a plurality of access points for a wireless LAN service that is provided by a certain carrier may be assigned the same ESSID.

The frequency band available for the wireless LAN 10 includes the 2.4 GHz band and the 5 GHz band. In the 2.4 GHz band, 13 channels are defined, namely, channels 1 to 13. The 5 GHz band includes 3 frequency bands: 5.15 to 5.25 GHz (W52), 5.25 to 5.35 GHz (W53), and 5.47 to 5.725 GHz (W56). In W52, 4 channels are defined, namely, channels 36, 40, 44, and 48. In W53, 4 channels are defined, namely, channels 52, 56, 60, and 62. In W56, 11 channels are defined, namely, channels 100, 104, . . . , and 140.

Each of the access points 11 and 12 selects one or more of the above channels. When the mobile communication apparatus 100 is not connected to any access point, the mobile communication apparatus 100 scans the 2.4 GHz band and the 5 GHz band. That is, the mobile communication apparatus 100 determines for each of the above channels whether there is an access point that uses the channel, and connects to a detected access point. Note that the access point 11 uses both a channel of the 2.4 GHz band and a channel of the 5 GHz band.

Figure 3:
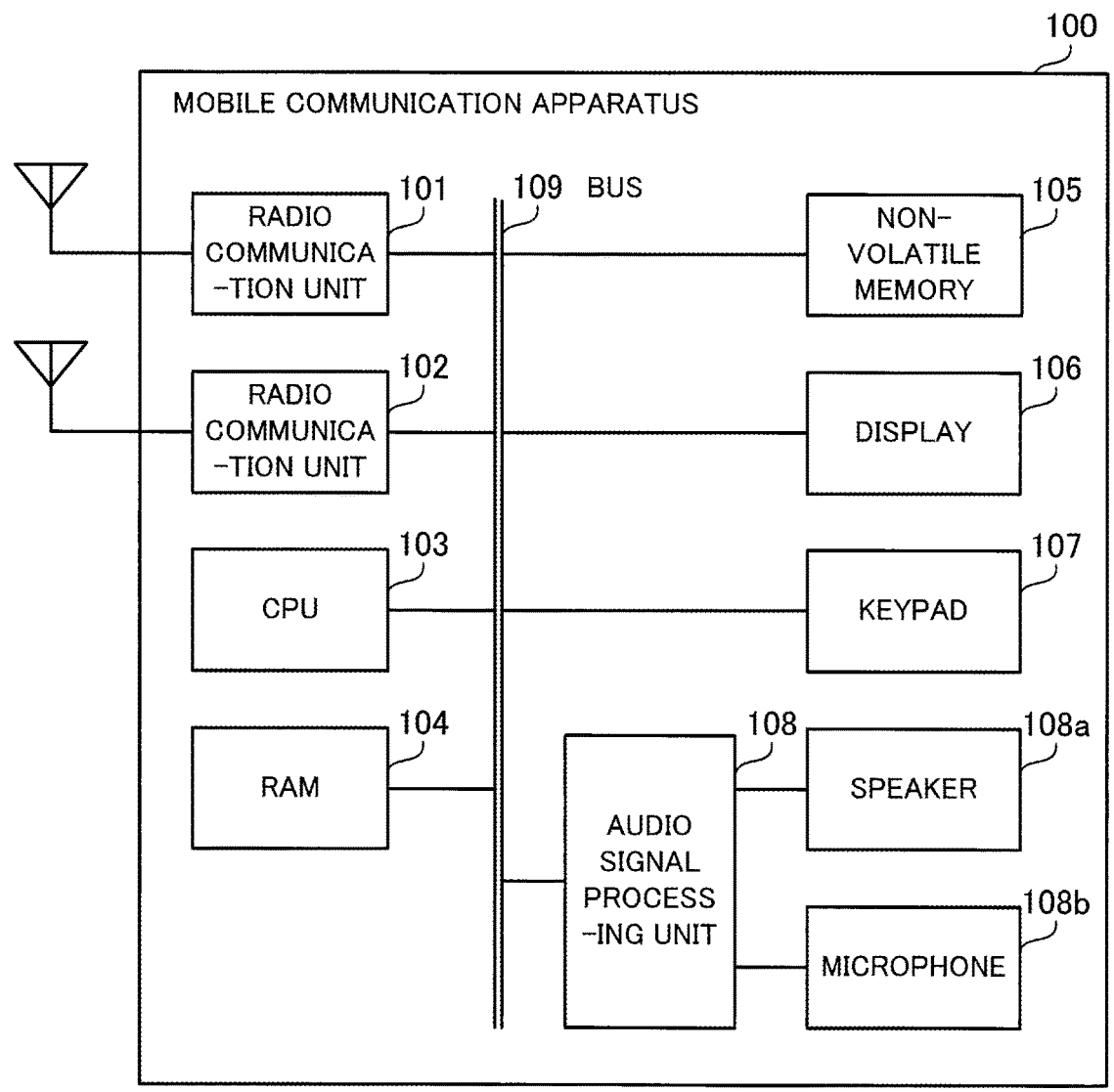
FIG. 3 is a block diagram illustrating an example of hardware of a mobile communication apparatus.

FIG. 3 is a block diagram illustrating an example of hardware of the mobile communication apparatus 100.

The mobile communication apparatus 100 includes radio communication units 101 and 102, a CPU 103, a RAM 104, a non-volatile memory 105, a display 106, a keypad 107, an audio signal processing unit 108, a speaker 108a, a microphone 108b, and a bus 109. The radio communication units 101 and 102, the CPU 103, the RAM 104, the non-volatile memory 105, the display 106, the keypad 107, and the audio signal processing unit 108 are connected to the bus 109. The speaker 108a and the microphone 108b are connected to the audio signal processing unit 108. Note that the radio communication unit 101 is an example of the radio communication unit 1a of the first embodiment. The CPU 103 is an example of the control unit 1b of the first embodiment.

The radio communication unit 101 is a radio interface that performs radio communication in accordance with the communication system of the wireless LAN 10. The radio communication unit 101 scans for an access point in response to an instruction from the CPU 103, and reports the scan result to the CPU 103. In the scan, the radio communication unit 101 measures the received signal strength of each of detected access points. In the second embodiment, RSSI is used as an index representing the received signal strength. The scan result includes the BSSID, ESSID, RSSI, channel number, and the like, of each detected access point. Further, the radio communication unit 101 performs a process of connecting to the access point specified by the CPU 103. This enables data communication via the access point.

Note that the radio communication unit 101 may process the radio signal of the 2.4 GHz band and the radio signal of the 5 GHz band in different time slots by internally switching the frequency. When scanning the 2.4 GHz band or performing communication using the 2.4 GHz band, the radio communication unit 101 sets a receiver and a transmitter to a frequency of the 2.4 GHz band. On the other hand, when scanning the 5 GHz band or performing communication using the 5 GHz band, the radio communication unit 101 sets the receiver and the transmitter to a frequency of the 5 GHz band. For scanning the 5 GHz band while a connection to the access point 11 is established in the 2.4 GHz band, communication in the 2.4 GHz band is temporarily suspended.

The radio communication unit 102 is a radio interface that performs radio communication in accordance with the communication system of the mobile phone network 20. The radio communication unit 102 connects to the base station 21 in response to an instruction from the CPU 103, and thus becomes able to perform a data communication via the base station 21. When the mobile communication apparatus 100 is not connected to any access point of the wireless LAN 10, data communication is performed using the radio communication unit 102. On the other hand, when the mobile communication apparatus 100 is connected to any of the access points of the wireless LAN 10, data communication is performed using the radio communication unit 101.

The CPU 103 is a processor that executes instructions of a program. The CPU 103 loads at least part of a program and data stored in the non-volatile memory 105 into the RAM 104 so as to execute operations in accordance with the program. Note that the CPU 103 may include multiple processor cores, and the mobile communication apparatus 100 may include multiple processors. Thus, processes described below may be executed in parallel by using multiple processors or processor cores. A set of multiple processors (a multiprocessor) may be referred to as a "processor".

The RAM 104 is a volatile semiconductor memory that temporarily stores a program executed by the CPU 103 and data referred to by the program. The mobile communication apparatus 100 may include other types of memories than a RAM, and may include a plurality of memories.

The non-volatile memory 105 is a non-volatile storage device that stores programs of software (such as an operation system (OS), middleware, application software, and the like) and data. The programs include a communication control program that controls radio communication by the radio communication unit 101. The non-volatile memory 105 may be, for example, a flash memory. The mobile communication apparatus 100 may include other types of storage devices such as a hard disk drive (HDD) and the like, and may include a plurality of non-volatile storage devices.

The display 106 displays the content of a Web page, an image, a video, and the like, and also displays an operation screen in response to an instruction from the CPU 103. The display 106 may be any of various types of displays such as a liquid crystal display (LCD), an organic electro-luminescence display (GELD), and the like.

The keypad 107 is an input device that receives an input from the user. The keypad 107 includes one or more keys, and outputs an input signal indicating a key pressed by the user to the CPU 103. Note that the mobile communication apparatus 100 may include other types of input devices such as a touch panel and the like, in place of or in addition to the keypad 107. For example, a touch panel is disposed on the display 106. The touch panel detects a touch operation on the display 106, and reports the touched position to the CPU 103.

The audio signal processing unit 108 processes an audio signal in response to an instruction from the CPU 103. The audio signal processing unit 108 acquires digital audio data, converts the digital audio data into an analog audio signal, and outputs the analog audio signal to the speaker 108a. Further, the audio signal processing unit 108 acquires an analog audio signal from the microphone 108b, and converts the analog audio signal into digital audio data.

The speaker 108a acquires an electrical signal representing an audio signal from the audio signal processing unit 108, and converts the electrical signal into a physical vibration to reproduce sound. For example, when the user is talking on the mobile communication apparatus 100, the speaker 108a reproduces the voice of the person to whom the user is talking and the background noise. The microphone 108b converts the physical vibration of sound into an electrical signal, and outputs the electrical signal representing an audio signal to the audio signal processing unit 108. For example, when the user is talking on the mobile communication apparatus 100, the voice of the user and the background noise are input to the microphone 108b.

The following describes connection control for controlling connection of the mobile communication apparatus 100 to an access point (dual-band access point) that uses both the 2.4 GHz band and the 5 GHz band.

Figure 4:
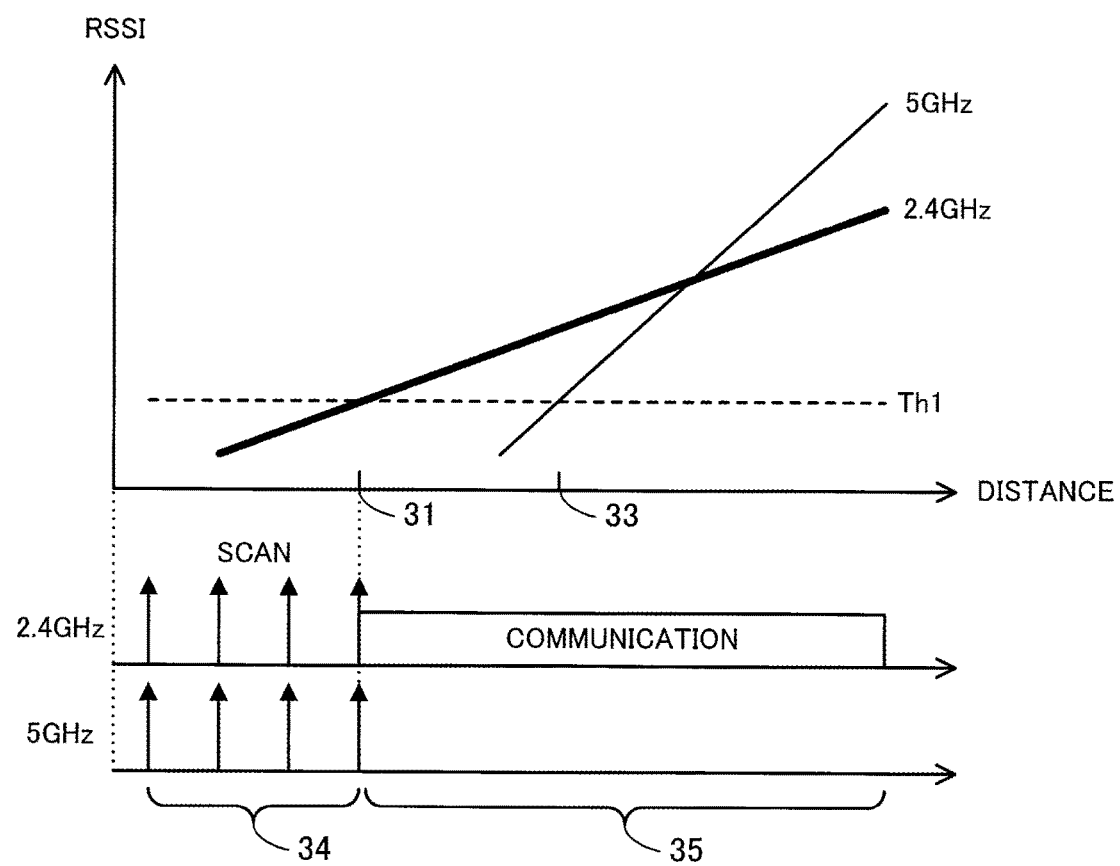
FIG. 4 illustrates problems with a dual-band access point.

FIG. 4 illustrates problems with a dual-band access point.

Consider a case in which the mobile communication apparatus 100 moves toward the access point 11 from the outside of the coverage area of the access point 11 while performing data communication. For example, there may be a case in which the user carrying the mobile communication apparatus 100 is walking toward a store where the access point 11 is installed while occasionally viewing Web pages using a Web browser.

The transmission power of the access point 11 in the 5 GHz band may be set to be greater than the transmission power of the 2.4 GHz band (a study by the applicant of the present application confirmed the existence of an access point whose transmission power in the 5 GHz band is greater than that in the 2.4 GHz band). On the other hand, the propagation distance of the radio signal of the 5 GHz band is less than that of the radio signal of the 2.4 GHz band.

As a matter of course, obstacles such as walls and people exist in the actual radio environment. Therefore, radio field strength varies due to reflection, fading, attenuation, and the like. However, there is the following general tendency in the relationship between the radio signal of the 2.4 GHz band and the radio signal of the 5 GHz band. At a position sufficiently distant from the access point 11, the radio signal of the 2.4 GHz band is detected, but the radio signal of the 5 GHz band is not detected. At a position moderately distant from the access point 11, both the radio signal of the 2.4 GHz band and the radio signal of the 5 GHz band are detected, and the former has a higher signal level than the latter. At a location sufficiently close to the access point 11, both the radio signal of the 2.4 GHz band and the radio signal of the 5 GHz band are detected, and the latter may have a higher signal level than the former.

When the mobile communication apparatus 100 is not connected to any access point, the mobile communication apparatus 100 performs a scan in both the 2.4 GHz band and the 5 GHz band. Then, in a section 34, the access point 11 is detected only in the 2.4 GHz band, but is not detected in the 5 GHz band. At a position 31, the RSSI of the 2.4 GHz band exceeds a threshold Th1. Then, the mobile communication apparatus 100 connects to the access point 11 using the 2.4 GHz band. The threshold Th1 is a boundary value of the RSSI for determining whether to establish a connection, and may be referred to as a connection threshold. The threshold Th1 corresponds to −80 dBm, for example.

Once the connection to the access point 11 is established in the 2.4 GHz band, the mobile communication apparatus 100 may maintain the connection while the RSSI of the access point 11 in the 2.4 GHz band is greater than or equal to a threshold Th3 (not illustrated), for example. The threshold Th3 is a boundary value of the RSSI for determining whether to terminate a connection, and may be referred to as a disconnection threshold. The threshold Th3 corresponds to −85 dBm, for example. In this case, after the connection to the access point 11 is established, the mobile communication apparatus 100 performs communication using the 2.4 GHz band in a section 35.

At a position 33 in the section 35, the RSSI in the 5 GHz band exceeds the threshold Th1. Further, when the mobile communication apparatus 100 moves sufficiently close to the access point 11, the RSSI of the 5 GHz band exceeds the RSSI of the 2.4 GHz band. Thus, it is preferable that the mobile communication apparatus 100 reconnect to the access point 11 using the 5 GHz band. However, if the connection in the 2.4 GHz band is maintained until the RSSI of the 2.4 GHz band falls below the threshold Th3 as mentioned above, there is no opportunity to use the 5 GHz band.

As described above, since the propagation distance of the radio signal of the 2.4 GHz band is longer than that of the 5 GHz band, each of the plurality of mobile communication apparatuses including the mobile communication apparatus 100 is likely to connect to the access point 11 using the 2.4 GHz band. Further, if each mobile communication apparatus uses the current connection preferentially, there is no opportunity to switch from the 2.4 GHz band to the 5 GHz band. This results in a problem of an imbalance in the use of the radio resources. That is, even if the access point 11 is a dual-access point, the radio resources in the 2.4 GHz band are used more frequently, and the radio resources in the 5 GHz band are used less frequently. In view of the above, in the second embodiment, the mobile communication apparatus 100 makes it possible to switch the connection from the 2.4 GHz band to the 5 GHz band.

Figure 5:
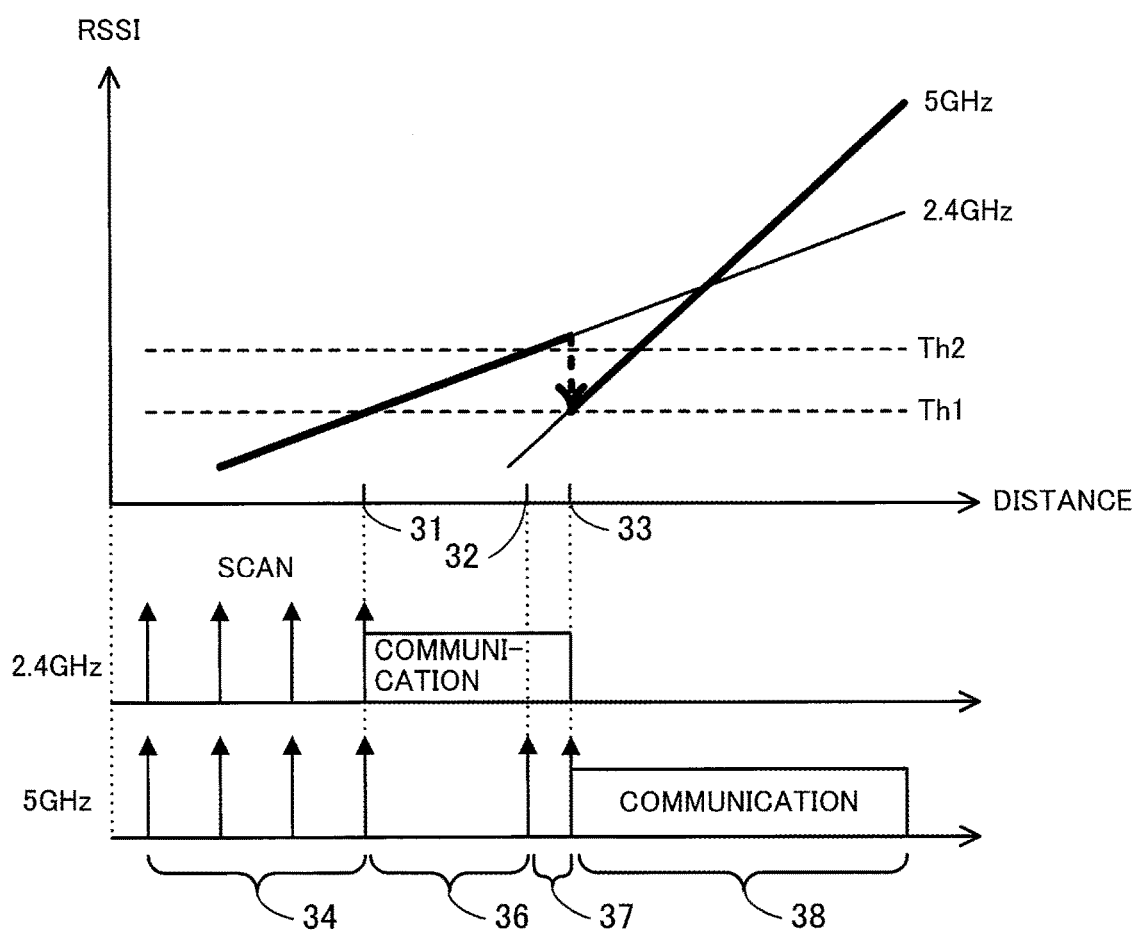
FIG. 5 illustrates an example of connecting to a dual-band access point.

FIG. 5 illustrates an example of connecting to a dual-band access point.

As in the case of FIG. 4, in the section 34, the mobile communication apparatus 100 scans the 2.4 GHz band and the 5 GHz band. At the position 31, the RSSI of the 2.4 GHz band exceeds the threshold Th1. Then, the mobile communication apparatus 100 connects to the access point 11 using the 2.4 GHz band. Then, in a section 36, the mobile communication apparatus 100 performs communication using the 2.4 GHz band while monitoring the RSSI of the 2.4 GHz band.

At a position 32, the RSSI of the 2.4 GHz band exceeds a threshold Th2. Then, the mobile communication apparatus 100 starts a scan of the 5 GHz band. The threshold Th2 is a boundary value of the RSSI for determining whether to perform a scan of the 5 GHz band while the connection in the 2.4 GHz band is established, and may be referred to as a scan threshold. The threshold Th2 corresponds to −60 dBm, for example. If the RSSI at 2.4 GHz exceeds the threshold Th2, the access point 11 is likely to be detected in the 5 GHz band. In this case, it is worth the mobile communication apparatus 100 scanning the 5 GHz band even while communicating in the 2.4 GHz band. On the other hand, if the RSSI at 2.4 GHz is less than or equal to the threshold Th2, the access point 11 is not likely to be detected in the 5 GHz band. In this case, it is appropriate for the mobile communication apparatus 100 not to scan the 5 GHz band.

In a section 37, the mobile communication apparatus 100 performs communication using the 2.4 GHz band, and intermittently scans the 5 GHz band. In the second embodiment, communication in the 2.4 GHz band is temporarily suspended while the 5 GHz band is scanned. Then, when the RSSI of the 5 GHz band exceeds the threshold Th1 at the position 33, the mobile communication apparatus 100 terminates the connection in the 2.4 GHz band, and reconnects to the access point 11 using the 5 GHz band. In a section 38, the mobile communication apparatus 100 performs communication using the 5 GHz band.

In this way, in the second embodiment, when the RSSI of the 2.4 GHz band exceeds the threshold Th1, the mobile communication apparatus 100 connects to the access point 11 using the 2.4 GHz band. After that, when the RSSI of the 2.4 GHz band exceeds the threshold Th2, the mobile communication apparatus 100 starts a scan of the 5 GHz band. Then, when the RSSI of the 5 GHz band exceeds the threshold Th1, the mobile communication apparatus 100 switches the frequency band to be used from the 2.4 GHz band to the 5 GHz band. Thus, it is possible to proactively use the 5 GHz band that is not frequently used by conventional mobile communication apparatuses. As a result, it is possible to improve the communication band and the transmission speed between the mobile communication apparatus 100 and the access point 11.

Figure 6A:
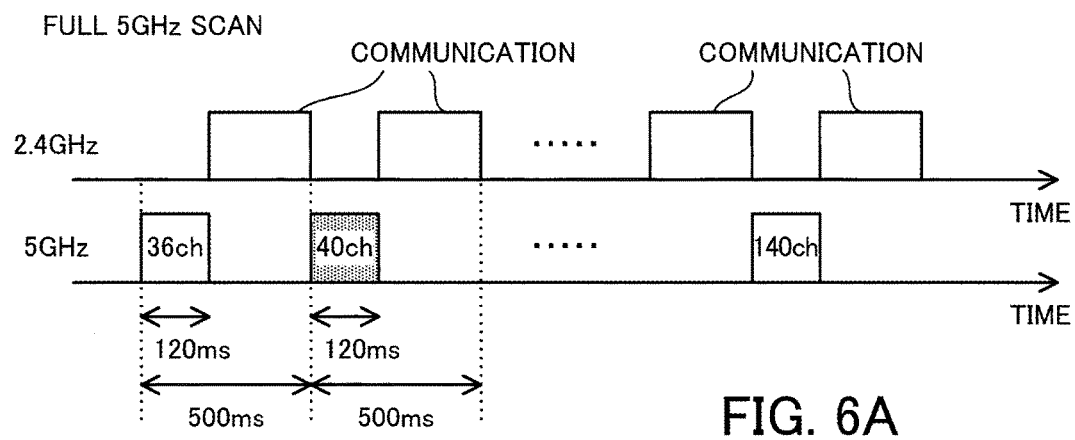
FIGS. 6A and 6B illustrate examples of timing of scan of a 5 GHz band.
Figure 6B:
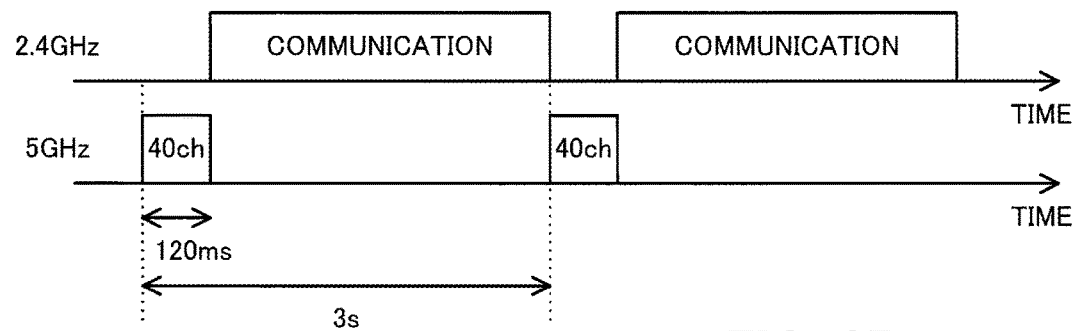

FIGS. 6A and 6B illustrate examples of the timing of scan of the 5 GHz band.

There are two types of scanning method for scanning the 5 GHz band during communication in the 2.4 GHz band: a full 5 GHz scan (FIG. 6A) and a fixed 5 GHz channel scan (FIG. 6B).

Upon starting a scan in the 5 GHz band, the mobile communication apparatus 100 first executes a full 5 GHz scan. In the full 5 GHz scan, a passive scan is performed on all the 19 channels defined in the 5 GHz band. In the passive scan, the mobile communication apparatus 100 sets the receiver of the radio communication unit 101 to a frequency of each channel, and monitors a received signal for a certain period of time. If there is an access point using the channel, a beacon including the BSSID and ESSID of the originating access point is received. When the beacon is received, the radio communication unit 101 measures the RSSI based on the received beacon.

In the full 5 GHz scan, a scan time of 120 milliseconds is allocated to each of the 19 channels. If there is an access point using the channel, a beacon is received once or twice during a time period of 120 milliseconds. The length of the interval from the start of a scan of a channel to the start of a scan of the next channel is preferably two or more times the length of the scan time per channel. For example, the interval may be 500 milliseconds. It is possible to perform communication in the 2.4 GHz band while a scan of the 5 GHz band is not performed. That is, communication in the 2.4 GHz band and a scan in the 5 GHz band are alternately performed in different time slots.

Note that the 19 channels may be scanned in ascending order of the channel number, or may be scanned in descending order of priority as will be described below. If the access point 11 is detected on a channel, subsequent scans do not need to be performed.

If the access point 11 is not detected in the full 5 GHz scan, the mobile communication apparatus 100 performs a full 5 GHz scan repeatedly as long as the RSSI of the 2.4 GHz band exceeds the threshold Th2. If the access point 11 is detected by the full 5 GHz scan and the RSSI of the 5 GHz band exceeds the threshold Th1, the mobile communication apparatus 100 terminates the connection in the 2.4 GHz band, and connects to the access point 11 at 5 GHz. If the access point 11 is detected by the full 5 GHz scan but the RSSI of the 5 GHz band is less than or equal to the threshold Th1, the mobile communication apparatus 100 executes a fixed 5 GHz channel scan.

In the fixed 5 GHz channel scan, a passive scan is performed only on a specific channel (channel 40 in FIGS. 6A and 6B) on which the access point 11 is detected in the full 5 GHz scan. In the fixed 5 GHz channel scan, a scan time of 120 milliseconds is allocated to the specific channel. A beacon is received once or twice from the access point 11 during a time period of 120 milliseconds. There is an interval of 3 seconds from the start of a scan of the specific channel to the start of the next scan of the channel. As in the case of the full 5 GHz scan, it is possible to perform communication in the 2.4 GHz band while a scan of the 5 GHz band is not performed.

The following describes the configuration of the mobile communication apparatus 100.

Figure 7:
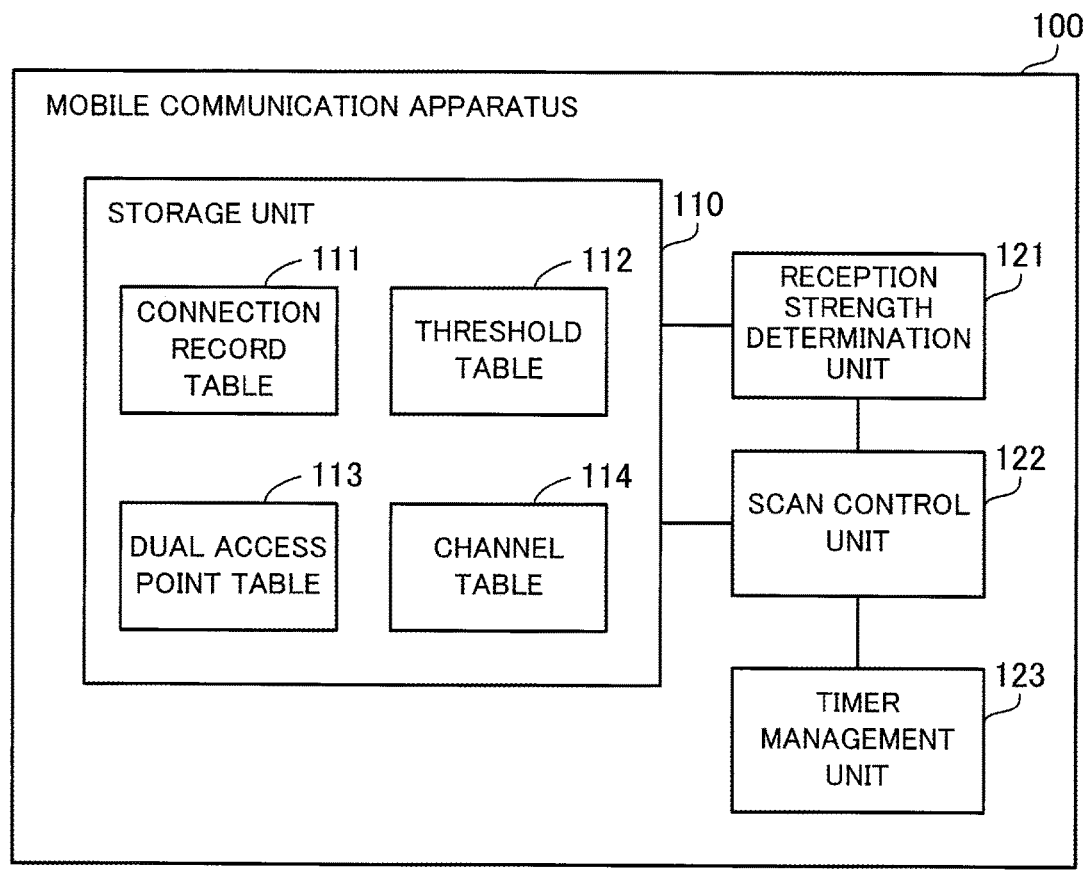
FIG. 7 is a block diagram illustrating an example of a software configuration of the mobile communication apparatus.

FIG. 7 is a block diagram illustrating an example of a software configuration of the mobile communication apparatus 100.

The mobile communication apparatus 100 includes a storage unit 110, a reception strength determination unit 121, a scan control unit 122, and a timer management unit 123. The storage unit 110 is implemented as a storage area reserved in the RAM 104 or the non-volatile memory 105, for example. The reception strength determination unit 121, the scan control unit 122, and the timer management unit 123 are implemented as modules of a communication control program executed by the CPU 103, for example.

The storage unit 110 stores control information used for controlling scan for an access point and controlling connection. The control information includes a connection record table 111, a threshold table 112, a dual access point table 113, and a channel table 114.

The connection record table 111 stores the ESSID of an access point to which the mobile communication apparatus 100 has previously connected in response to an instruction from the user. The connection record table 111 is appropriately updated by the CPU 103. The threshold table 112 stores thresholds (the thresholds Th1, Th2, and Th3 described above, and the like) used for scan control and connection control. The thresholds may be set in advance at the time of manufacture or shipment of the mobile communication apparatus 100. Further, the thresholds may be updated when software is updated after shipment of the mobile communication apparatus 100.

The dual access point table 113 stores the ESSID of a dual-band access point that uses both the 2.4 GHz band and the 5 GHz band. Some access points may use different ESSIDs in the 2.4 GHz band and the 5 GHz band. In this case, the ESSID for the 2.4 GHz band and the ESSID for the 5 GHz band are registered in association with each other. The ESSIDs of dual-band access points owned by major carriers and stores may be registered in the dual access point table 113 at the time of manufacture or shipment of the mobile communication apparatus 100. Further, the dual access point table 113 may be updated when software is updated, after shipment of the mobile communication apparatus 100.

The channel table 114 stores the channel number of a channel of the 5 GHz band to which the mobile communication apparatus 100 has previously connected. Upon scanning the 5 GHz band, it is possible to reduce the scan time of a full 5 GHz scan by preferentially scanning a previously connected channel. The channel table 114 is appropriately updated by the CPU 103.

When the radio communication unit 101 performs a scan (including a 2.4 GHz scan and a 5 GHz scan), the reception strength determination unit 121 acquires the scan result from the radio communication unit 101. The scan result includes the BSSID and ESSID of the detected access point, the measured RSSI, the channel number of a channel on which the access point is detected, and the like.

Having acquired the scan result, the reception strength determination unit 121 compares the ESSID registered in the connection record table 111 with the detected ESSID. Further, the reception strength determination unit 121 compares the thresholds registered in the threshold table 112 with the measured RSSI. Then, the reception strength determination unit 121 issues a notification to the scan control unit 122 in accordance with the result of the comparison. Notifications issued from the reception strength determination unit 121 to the scan control unit 122 include notifications of "availability of 2.4 GHz", "non-availability of 2.4 GHz", "permission of scan", "rejection of scan", "detection of a 5 GHz access point", "availability of 5 GHz", and "non-availability of 5 GHz".

The notification of "availability of 2.4 GHz" indicates that the RSSI of the 2.4 GHz band has exceeded the connection threshold. The notification of "non-availability of 2.4 GHz" indicates that the RSSI of the 2.4 GHz band has fallen below the disconnection threshold. The notification of "permission of scan" indicates that the RSSI of the 2.4 GHz band has exceeded the scan threshold. The notification of "rejection of scan" indicates that the RSSI of the 2.4 GHz band has fallen to or below the scan threshold. The notification of "detection of a 5 GHz access point" indicates that an access point is detected in a full 5 GHz scan. The notification of "availability of 5 GHz" indicates that the RSSI of the 5 GHz band has exceeded the connection threshold. The notification of "non-availability of 5 GHz" indicates that the RSSI of the 5 GHz band has fallen below the disconnection threshold.

The scan control unit 122 controls scan for an access point and connection by the radio communication unit 101. The scan control unit 122 determines, in accordance with a notification from the scan control unit 122, whether to establish or terminate a connection in the 2.4 GHz band, whether to establish or terminate a connection in the 5 GHz band, whether to start or stop a full 5 GHz scan, and whether to start or stop a fixed 5 GHz channel scan. Upon determining whether to start a full 5 GHz scan, the scan control unit 122 compares the ESSID used in the 2.4 GHz band by the currently connected access point with the ESSID registered in the dual access point table 113. A full 5 GHz scan starts only in the case where the currently connected access point is a dual-band access point. Thus, it is possible to prevent a scan of the 5 GHz band from being performed when the 5 GHz band is not used.

The scan control unit 122 instructs the radio communication unit 101 to perform processing such as connection, scan, and the like, in accordance with the determination. In the case of instructing a full 5 GHz scan, the scan control unit 122 reports the channel of the 5 GHz band registered in the channel table 114 to the radio communication unit 101. Thus, the previously connected channel is preferentially scanned.

The timer management unit 123 manages the timing of scan, using a timer mechanism (for example, a timer function of the OS, a hardware timer, or the like). The timer management unit 123 receives a timer request including a specified time from other units such as the scan control unit 122 and so on. When the specified period of time elapses from the reception of the timer request, the timer management unit 123 outputs a timer interruption to a unit that issued the timer request.

Figure 8:
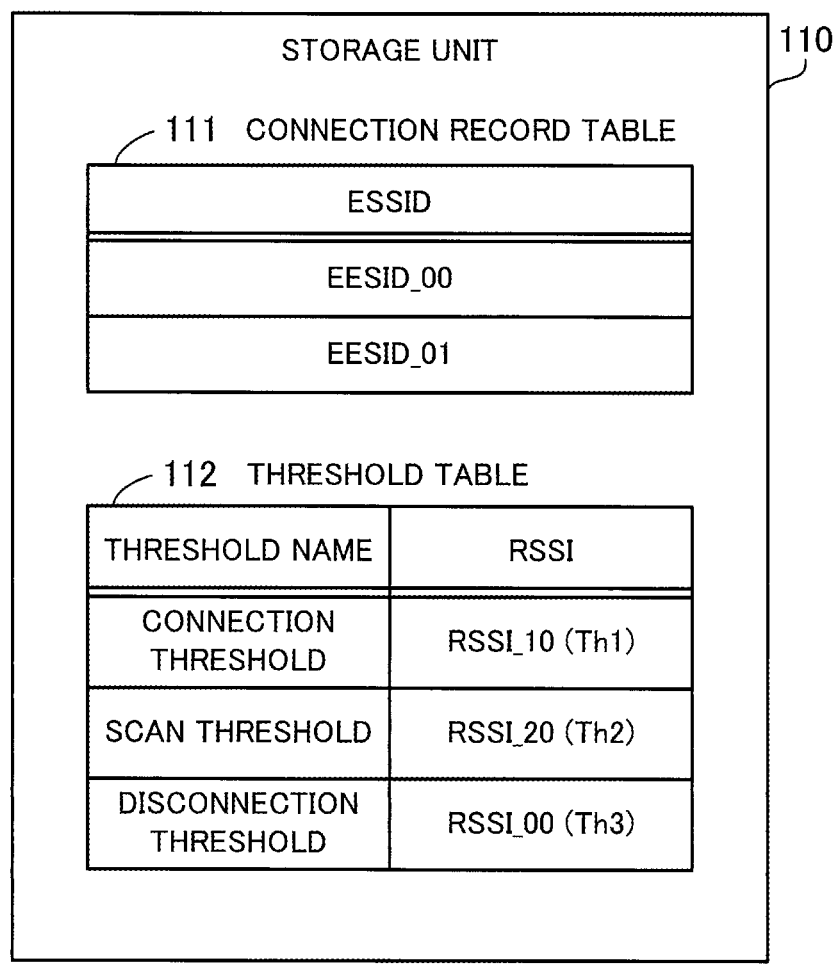
FIG. 8 illustrates an example of a connection record table and a threshold table.

FIG. 8 illustrates an example of the connection record table 111 and the threshold table 112.

The connection record table 111 includes a list of ESSIDs. The ESSIDs registered in the connection record table 111 include the ESSID of an access point to which the mobile communication apparatus 100 has previously connected in response to an instruction from the user. The mobile communication apparatus 100 is able to automatically connect to an access point having the same ESSID as an access point that has previously been selected by the user, even without an explicit instruction from the user. In the example of FIG. 8, "ESSID_00" and "ESSID_01" are registered in the connection record table 111.

Note that the BSSID of a previously connected access point may be stored in the connection record table 111 instead of or together with the ESSID. In this case, the mobile communication apparatus 100 may allow an automatic connection only to an access point having the same BSSID as (that is, an access point physically identical to) an access point that has previously been selected by the user.

The threshold table 112 includes a list of pairs of a threshold name and an RSSI as its value. The thresholds include a connection threshold, a scan threshold, and a disconnection threshold. The connection threshold corresponds to the threshold Th1 described above, and is a reference value for the RSSI for determining whether to connect to a detected access point. The scan threshold corresponds to the threshold Th2 described above, and is a reference value for the RSSI for determining whether to perform a scan of the 5 GHz during use of the 2.4 GHz band. The disconnection threshold corresponds to the threshold Th3 described above, and is a reference value for the RSSI for determining whether to terminate the current connection.

In the example of FIG. 8, "RSSI_10" as the connection threshold, "RSSI_20" as the scan threshold, and "RSSI_00" as the disconnection threshold are registered in the threshold table 112. Note that the two-digit number of an RSSI in the second embodiment is proportional to the RSSI, and increases as the RSSI increases. Accordingly, the connection threshold is greater than the disconnection threshold, and the scan threshold is greater than the connection threshold. For example, RSSI_00 corresponds to −85 dBm; RSSI_10 corresponds to −80 dBm; and RSSI_20 corresponds to −60 dBm.

Figure 9:
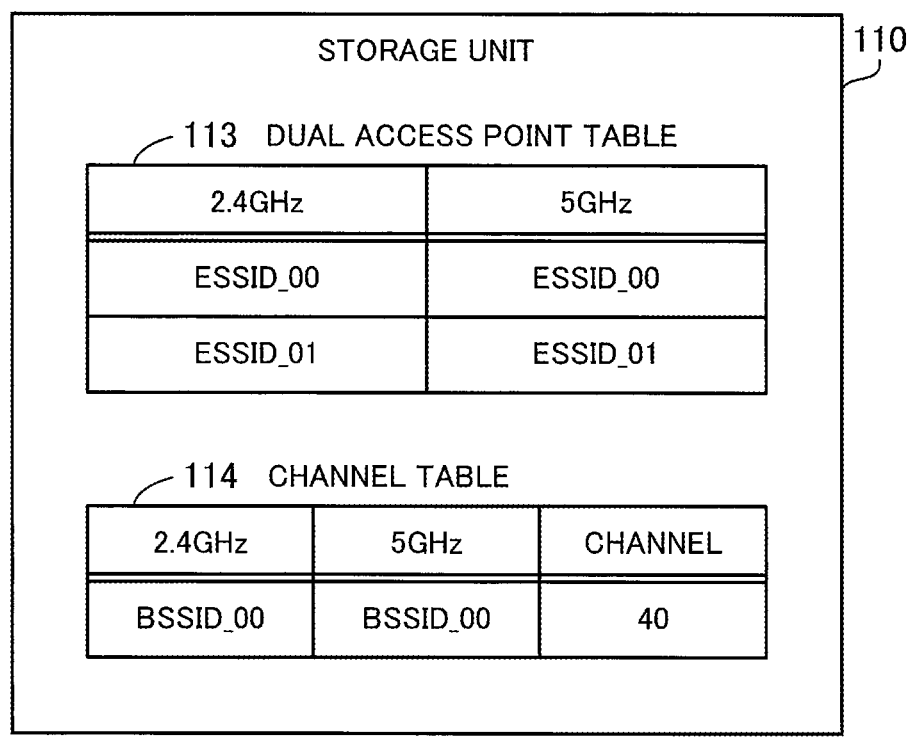
FIG. 9 illustrates an example of a dual access point table and a channel table.

FIG. 9 illustrates an example of the dual access point table 113 and the channel table 114.

The dual access point table 113 includes a list of pairs of the ESSID for the 2.4 GHz band and the ESSID for the 5 GHz band. Two ESSIDs included in each pair are ESSIDs used by the same access point. As for an access point that uses the same ESSID in the 2.4 GHz band and the 5 GHz band, the two ESSIDs included in the pair have the same value. In the example of FIG. 9, {ESSID_00, ESSID_00} and {ESSID_01, ESSID_01} are registered in the dual access point table 113. For example, the access point 11 uses "ESSID_00" in both the 2.4 GHz band and the 5 GHz band.

The channel table 114 includes a list of sets each including the BSSID for the 2.4 GHz band, the BSSID for the 5 GHz band, and the channel number of the channel of the 5 GHz band. The channel used in the 5 GHz band may change dynamically. Thus, a plurality of channel numbers (for example, a maximum of 3 channel numbers) of previously connected channels may be registered. In the example of FIG. 9, {BSSID_00, BSSID_00, 40} is registered in the channel table 114. For example, the access point 11 uses "BSSID_00" in both the 2.4 GHz band and the 5 GHz band, and has used channel 40 previously.

The following describes processing performed by the mobile communication apparatus 100.

Figure 10:
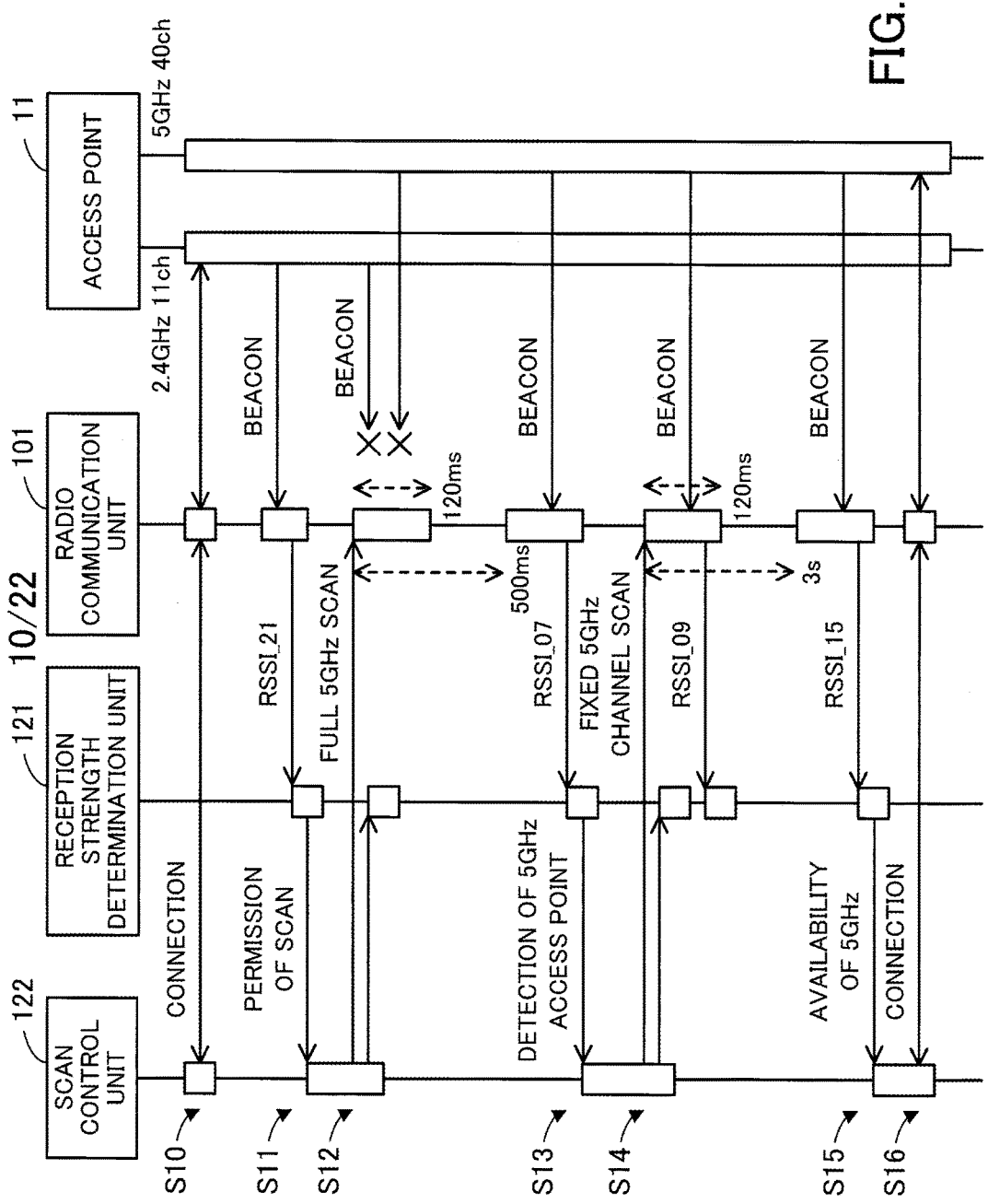
FIG. 10 is a sequence diagram illustrating an example of connection control of the 5 GHz band.

FIG. 10 is a sequence diagram illustrating an example of connection control of the 5 GHz band.

In this example, the access point 11 uses channel 11 of the 2.4 GHz band and channel 40 of the 5 GHz band, and periodically transmits beacons on channel 11 and channel 40. Further, the ESSIDs used by the access point 11 in the 2.4 GHz band and the 5 GHz band are registered in the connection record table 111 and the dual access point table 113.

(S10) The radio communication unit 101 detects the access point 11 on channel 11 of the 2.4 GHz band. The reception strength determination unit 121 determines that the RSSI of a signal received from the access point 11 exceeds the connection threshold (RSSI_10). Then, the scan control unit 122 instructs the radio communication unit 101 to connect to the access point 11. The radio communication unit 101 performs a connection procedure to connect to the access point 11 using channel 11 of the 2.4 GHz.

(S11) The radio communication unit 101 receives a beacon of channel 11 from the access point 11. A beacon is transmitted periodically at intervals of about 100 milliseconds. The beacon includes the BSSID, ESSID, and the like, of the originating access point 11. The radio communication unit 101 measures the RSSI based on the received beacon. In this example, the measured RSSI is RSSI_21. The radio communication unit 101 notifies the reception strength determination unit 121 of the scan result indicating channel 11 and RSSI_21, in addition to the ESSID and BSSID.

When the RSSI of the 2.4 GHz band is measured while the connection in the 2.4 GHz band is established, the reception strength determination unit 121 compares the measured RSSI with the scan threshold (RSSI_20). In this example, the reception strength determination unit 121 determines that RSSI 21>the scan threshold. Then, the reception strength determination unit 121 notifies the scan control unit 122 of "permission of scan".

(S12) Having been notified of "permission of scan" by the reception strength determination unit 121, the scan control unit 122 notifies the radio communication unit 101 and the reception strength determination unit 121 of start of a full 5 GHz scan. The radio communication unit 101 starts a full 5 GHz scan. In this example, the radio communication unit 101 scans the 19 channels of the 5 GHz band sequentially, starting with the channel (channel 36) with the lowest frequency. Thus, the radio communication unit 101 first scans channel 36 for 120 milliseconds. However, since the access point 11 does not use channel 36, no beacon is received in the scan of channel 36.

(S13) When no access point is detected in channel 36, the radio communication unit 101 starts a scan of channel 40 after 500 milliseconds from the start of the scan of channel 36. Since the access point 11 uses channel 40, a beacon is received in the scan of channel 40. Then, the radio communication unit 101 measures the RSSI based on the received beacon. In this example, the measured RSSI is RSSI_07. The radio communication unit 101 notifies the reception strength determination unit 121 of the scan result indicating channel 40 and RSSI_07.

In response to the detection of the access point 11 in the full 5 GHz scan, the reception strength determination unit 121 compares the measured RSSI with the connection threshold. In this example, the reception strength determination unit 121 determines that RSSI_07≤the connection threshold. Then, the reception strength determination unit 121 notifies the scan control unit 122 of "detection of a 5 GHz access point".

(S14) Having been notified of "detection of a 5 GHz access point" by the reception strength determination unit 121, the scan control unit 122 notifies the radio communication unit 101 and the reception strength determination unit 121 of start of a fixed 5 GHz channel scan. In this step, channel 40 on which the access point 11 is detected is specified for the radio communication unit 101 as a channel to be scanned. The radio communication unit 101 starts a fixed 5 GHz channel scan for channel 40. That is, the radio communication unit 101 scans channel 40 for 120 milliseconds. The radio communication unit 101 does not have to scan other channels than the channel that is specified by the scan control unit 122 as a channel to be scanned.

In this example, a beacon is received from the access point 11, and the measured RSSI is RSSI_09. The radio communication unit 101 notifies the reception strength determination unit 121 of the scan result indicating channel 40 and RSSI_09. When the RSSI of the 5 GHz band is measured in the fixed 5 GHz channel scan, the reception strength determination unit 121 compares the measured RSSI with the connection threshold. In this example, the reception strength determination unit 121 determines that RSSI_09≤the connection threshold. Then, the reception strength determination unit 121 does not issue any notification to the scan control unit 122. Thus, the radio communication unit 101 repeats a fixed 5 GHz channel scan.

(S15) The radio communication unit 101 performs a scan of channel 40 channel again after 3 seconds from the start of the previous scan of channel 40. In this example, a beacon is received from the access point 11, and the measured RSSI is RSSI_15. The radio communication unit 101 notifies the reception strength determination unit 121 of the scan result indicating channel 40 and RSSI_15. The reception strength determination unit 121 determines that RSSI 15>the connection threshold. Then, the reception strength determination unit 121 notifies the scan control unit 122 of "availability of 5 GHz".

(S16) Having been notified of "availability of 5 GHz" by the reception strength determination unit 121, the scan control unit 122 instructs the radio communication unit 101 to establish a connection to the access point 11 using channel 40. The radio communication unit 101 terminates the connection using channel 11 of the 2.4 GHz band, and performs a connection procedure to connect to the access point 11 using channel 40 of the 5 GHz band. That is, the radio communication unit 101 performs switching from the 2.4 GHz band to the 5 GHz band.

Figure 11:
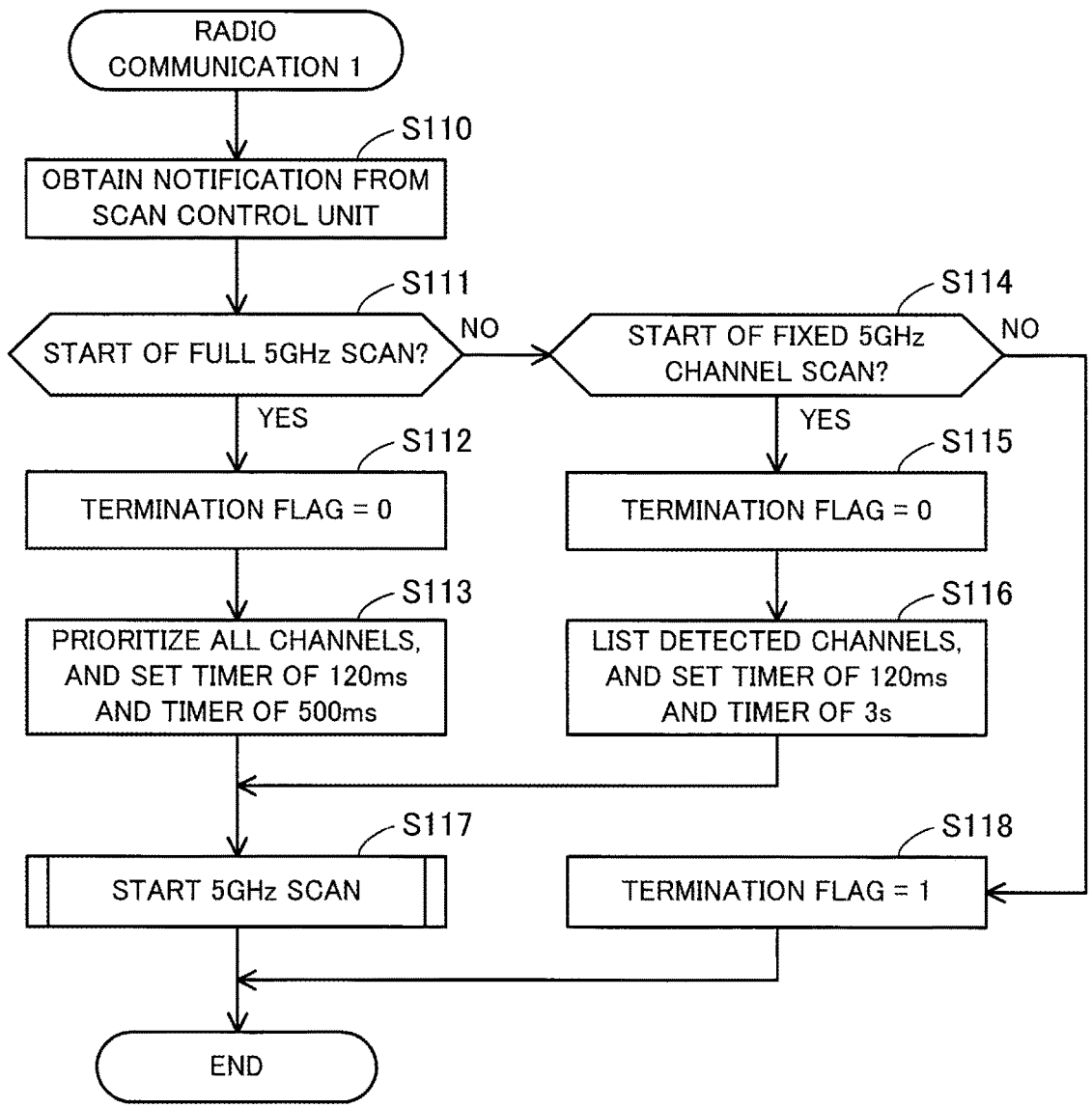
FIG. 11 is a flowchart illustrating an example of a first process by a radio communication unit.

FIG. 11 is a flowchart illustrating an example of a first process by the radio communication unit 101.

This process is performed by the radio communication unit 101 in accordance with a notification from the scan control unit 122.

(S110) The radio communication unit 101 obtains a notification from the scan control unit 122. Notifications that may be obtained in this step include the following notifications: start of a full 5 GHz scan; start of a fixed 5 GHz channel scan; and termination of a 5 GHz scan.

(S111) The radio communication unit 101 determines whether the notification obtained in step S110 is a notification of start of a full 5 GHz scan. If a notification of start of a full 5 GHz scan is obtained, the process proceeds to step S112. If not, the process proceeds to step S114.

(S112) The radio communication unit 101 sets a termination flag to 0. The termination flag indicates whether to terminate iteration of scan, and is held by the radio communication unit 101.

(S113) The radio communication unit 101 prioritizes the 19 channels of the 5 GHz band, and determines the scan order in which the 19 channels are scanned. If a connection record of a channel is not reported from the scan control unit 122, the radio communication unit 101 may determine the scan order such that channels are scanned in ascending order of frequency or in descending order of frequency. If a connection record of a channel is reported, it is preferable that the radio communication unit 101 assign a higher priority to a previously connected channel such that the previously connected channel is scanned first. Further, the radio communication unit 101 sets a timer of 120 milliseconds to indicate the scan time per channel and a timer of 500 milliseconds to indicate the scan interval. Then, the process proceeds to step S117.

(S114) The radio communication unit 101 determines whether the notification obtained in step S110 is a notification of start of a fixed 5 GHz channel scan. If a notification of start of a fixed 5 GHz channel scan is obtained, the process proceeds to step S115. If not, the process proceeds to step S118. Note that "if not" as used herein refers to, for example, 'if a notification of termination of a 5 GHz scan is obtained.

(S115) The radio communication unit 101 sets the termination flag to 0.

(S116) The radio communication unit 101 lists the channels on which access points are detected in the full 5 GHz scan as channels to be scanned. The channels to be scanned are indicated by the scan control unit 122. Further, the radio communication unit 101 sets a timer of 120 milliseconds to indicate the scan time per channel and a timer of 3 seconds to indicate the scan interval.

(S117) The radio communication unit 101 starts a 5 GHz scan (a full 5 GHz scan or a fixed 5 GHz channel scan). The details of the scan will be described below.

(S118) The radio communication unit 101 sets the termination flag to 1.

Figure 12:
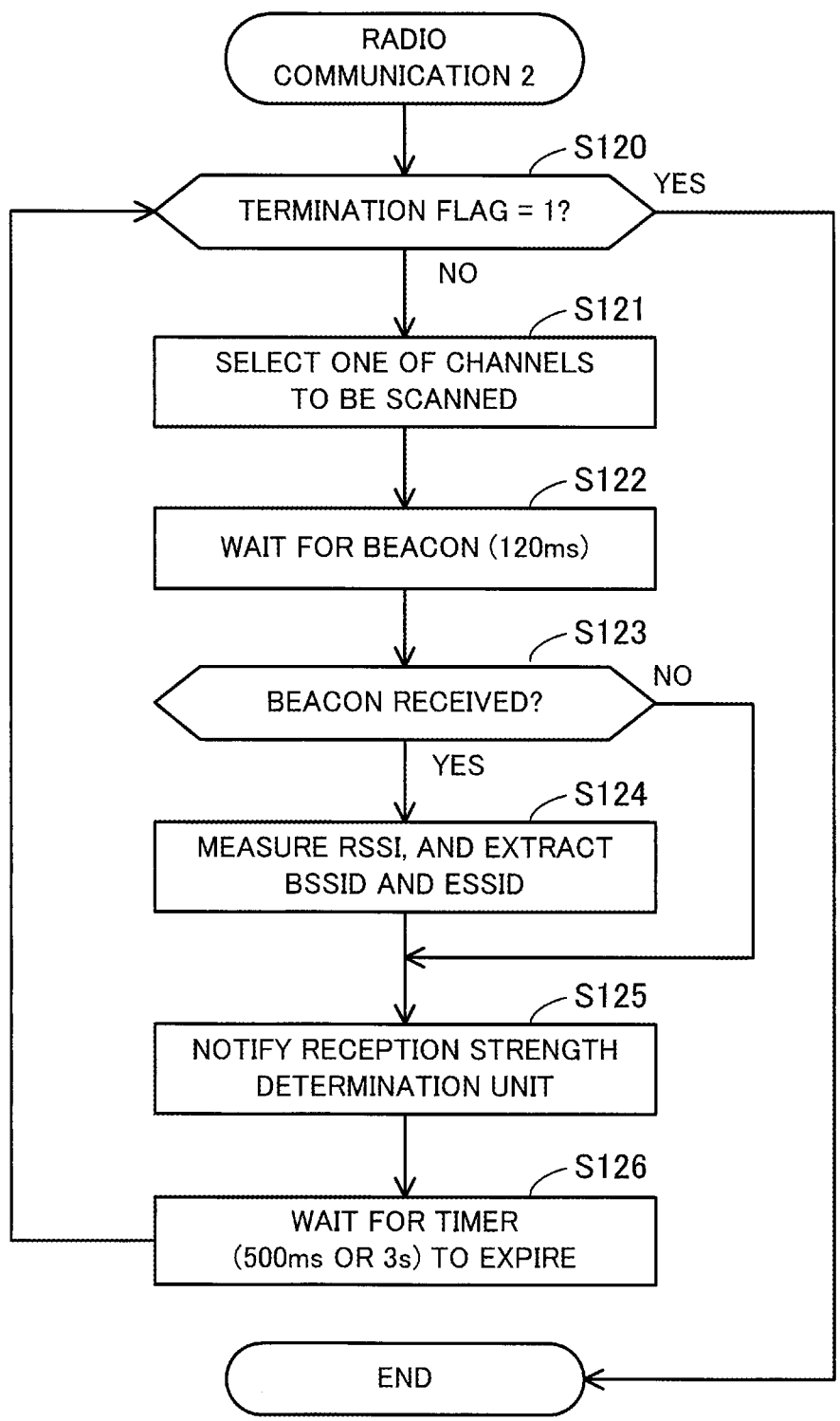
FIG. 12 is a flowchart illustrating an example of a second process by the radio communication unit.

FIG. 12 is a flowchart illustrating an example of a second process by the radio communication unit 101.

This process is started in the above step S117, and executed in parallel with the process of FIG. 11. Accordingly, while the process of FIG. 12 is performed, the termination flag may be updated in response to a notification from the scan control unit 122 as illustrated in FIG. 11. Note that although FIGS. 11 and 12 illustrate mainly a 5 GHz band scan, a 2.4 GHz scan may also be performed.

(S120) The radio communication unit 101 determines whether the termination flag=1. If the termination flag=1, the 5 GHz scan is terminated. If the termination flag=0, the process proceeds to step S121. The termination flag is updated in accordance with the flowchart of FIG. 11.

(S121) The radio communication unit 101 selects one of the channels to be scanned which are listed in the above step S113 or S116 in accordance with the determined order. Note that when a scan of the last channel completes, the first channel is selected again. That is, one or more listed channels are scanned repeatedly.

(S122) The radio communication unit 101 waits for a beacon to be received for 120 milliseconds. The scan time is managed by the timers that are set in the above step S113 or S116.

(S123) The radio communication unit 101 determines whether a beacon is received in step S122. If a beacon is received, the process proceeds to step S124. If no beacon is received, the process proceeds to step S125.

(S124) The radio communication unit 101 measures the RSSI based on the received beacon. Further, the radio communication unit 101 extracts a BSSID and an ESSID from the beacon.

(S125) The radio communication unit 101 notifies the reception strength determination unit 121 of the scan result. If a beacon is received, the radio communication unit 101 notifies of the scan result including the BSSID and ESSID extracted in step S124, the measured RSSI, the channel number of the scanned channel, and the like. If no beacon is received, the radio communication unit 101 may notify of the scan result indicating that no access point is detected.

(S126) The radio communication unit 101 waits for the time to start a scan of the next channel. The scan of the next channel is performed after 500 milliseconds or 3 seconds from the start of step S122. The radio communication unit 101 may perform communication in the 2.4 GHz band until the next time step S122 starts. The scan interval is managed by the timers that are set in the above step S113 or S116. Then, the process proceeds to step S120.

Figure 13:
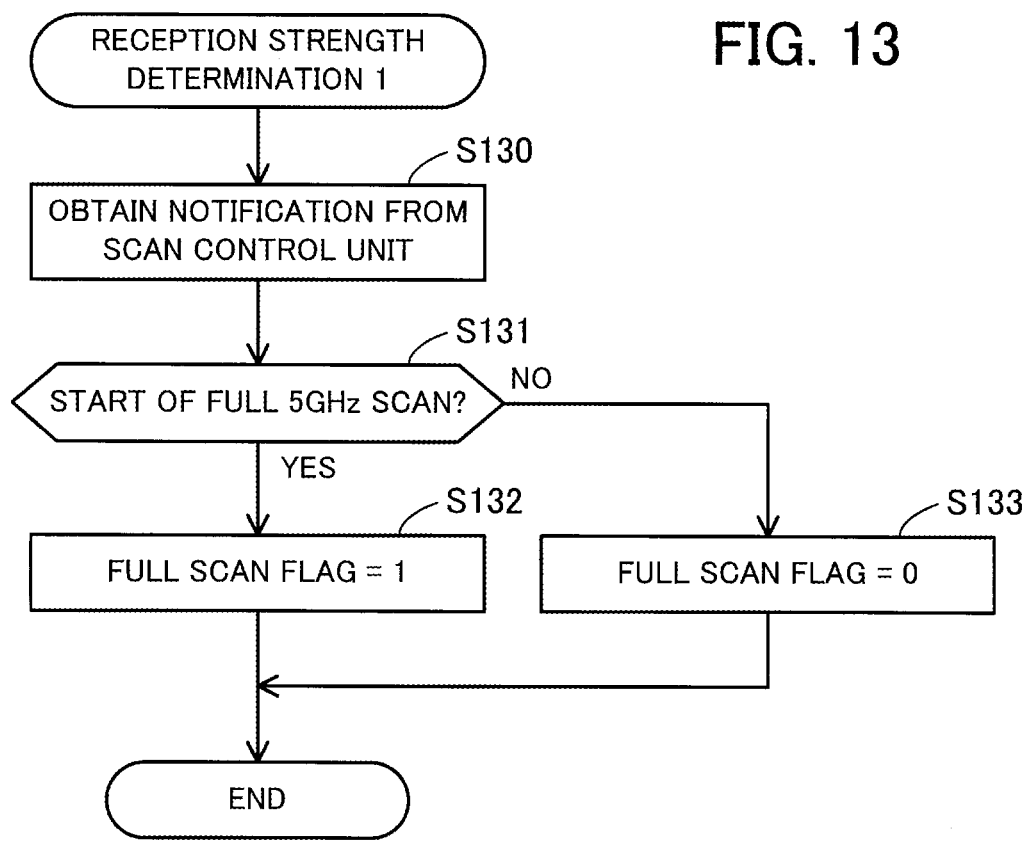
FIG. 13 is a flowchart illustrating an example of a first process by a reception strength determination unit.

FIG. 13 is a flowchart illustrating an example of a first process by the reception strength determination unit 121.

This process is performed by the reception strength determination unit 121 in accordance with a notification from the scan control unit 122.

(S130) The reception strength determination unit 121 obtains a notification from the scan control unit 122. The notification obtained from the scan control unit 122 may be a notification of start of a full 5 GHz scan, start of a fixed 5 GHz channel scan, or termination of a 5 GHz scan.

(S131) The reception strength determination unit 121 determines whether the notification obtained in step S130 is a notification of start of a full 5 GHz scan. If a notification of start of a full 5 GHz scan is obtained, the process proceeds to step S132. If not, the process proceeds to step S133. Note that "if not" as used herein refers to, for example, 'if a notification of start of a fixed 5 GHz channel scan is obtained' and 'if a notification of termination of a 5 GHz scan is obtained'.

(S132) The reception strength determination unit 121 sets a full scan flag to 1. The full scan flag indicates whether the radio communication unit 101 is executing a full 5 GHz scan. The full scan flag is stored in the storage area of the RAM 104 used by the reception strength determination unit 121, for example. Then, the process in accordance with the notification from the scan control unit 122 ends.

(S133) The reception strength determination unit 121 sets the full scan flag to 0.

Figure 14:
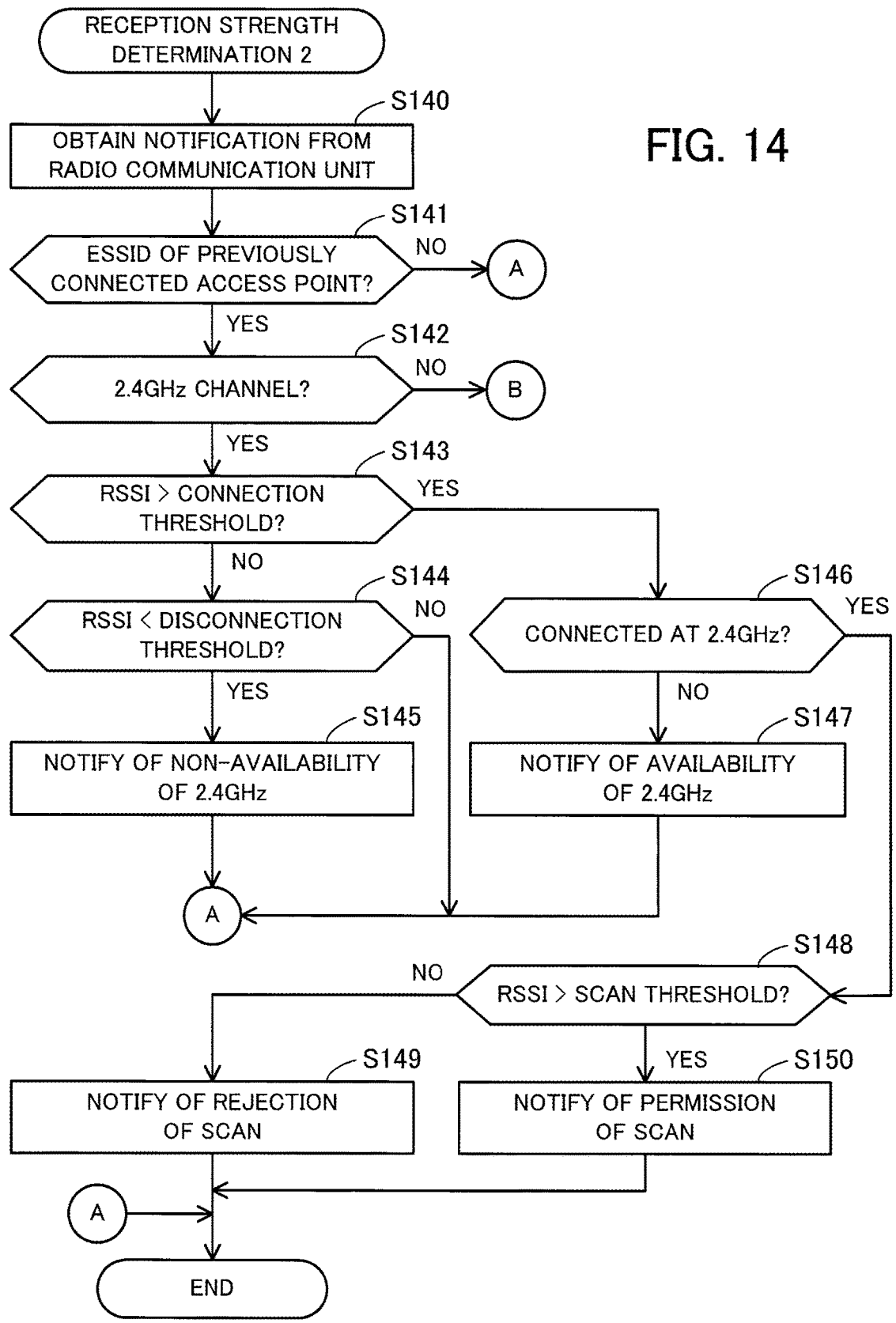
FIGS. 14 and 15 are flowcharts illustrating an example of a second process by the reception strength determination unit.

FIG. 14 is a flowchart illustrating an example of a second process by the reception strength determination unit 121.

This process is performed by the reception strength determination unit 121 in accordance with a notification from the radio communication unit 101.

(S140) The reception strength determination unit 121 obtains a notification from the radio communication unit 101. The scan result includes the BSSID and ESSID of the detected access point, the measured RSSI, and the channel number of a channel on which the access point is detected.

(S141) The reception strength determination unit 121 determines whether the ESSID of the detected access point is registered in the connection record table 111, that is, whether the ESSID is of a previously connected access point. If the ESSID is of a previously connected access point, the process proceeds to step S142. If not, the process by the reception strength determination unit 121 ends.

(S142) The reception strength determination unit 121 determines a channel on which an access point having an ESSID of a previously connected access point is detected, and determines whether the channel is a channel of the 2.4 GHz band. That is, the reception strength determination unit 121 determines whether the frequency band in which the desired access point is detected is the 2.4 GHz band. The determination as to whether the channel is a channel of the 2.4 GHz band or a channel of the 5 GHz band may be made based on the channel number included in the scan result obtained in step S140. If the channel is a channel of the 2.4 GHz band, the process proceeds to step S143. If the channel is a channel of the 5 GHz band, the process proceeds to step S151.

(S143) The reception strength determination unit 121 determines whether the RSSI measured by the radio communication unit 101 is greater than the connection threshold (RSSI_10) registered in the threshold table 112. If the measured RSSI is greater than the connection threshold, the process proceeds to step S146. If the measured RSSI is less than or equal to the connection threshold, the process proceeds to step S144.

(S144) The reception strength determination unit 121 determines whether the RSSI measured by the radio communication unit 101 is less than the disconnection threshold (RSSI_00) registered in the threshold table 112. If the measured RSSI is less than the disconnection threshold, the process proceeds to step S145. If the measured RSSI is greater than or equal to the disconnection threshold, the process by the reception strength determination unit 121 ends.

(S145) The reception strength determination unit 121 notifies the scan control unit 122 of the non-availability of 2.4 GHz. Then, the process by the reception strength determination unit 121 ends.

(S146) The reception strength determination unit 121 determines whether the mobile communication apparatus 100 is currently connected to any access point using the 2.4 GHz band (whether a connection is established in the 2.4 GHz band). If the connection is established in the 2.4 GHz band, the process proceeds to step S148. If the connection is not established in the 2.4 GHz band, the process proceeds to step S147.

(S147) The reception strength determination unit 121 notifies the scan control unit 122 of the availability of 2.4 GHz. Then, the process by the reception strength determination unit 121 ends.

(S148) The reception strength determination unit 121 determines whether the RSSI measured by the radio communication unit 101 is greater than the scan threshold (RSSI_20) registered in the threshold table 112. If the measured RSSI is greater than the scan threshold, the process proceeds to step S150. If the measured RSSI is less than or equal to the scan threshold, the process proceeds to step S149.

(S149) The reception strength determination unit 121 notifies the scan control unit 122 of rejection of scan. Then, the process by the reception strength determination unit 121 ends.

(S150) The reception strength determination unit 121 notifies the scan control unit 122 of permission of scan. Then, the process by the reception strength determination unit 121 ends.

Figure 15:
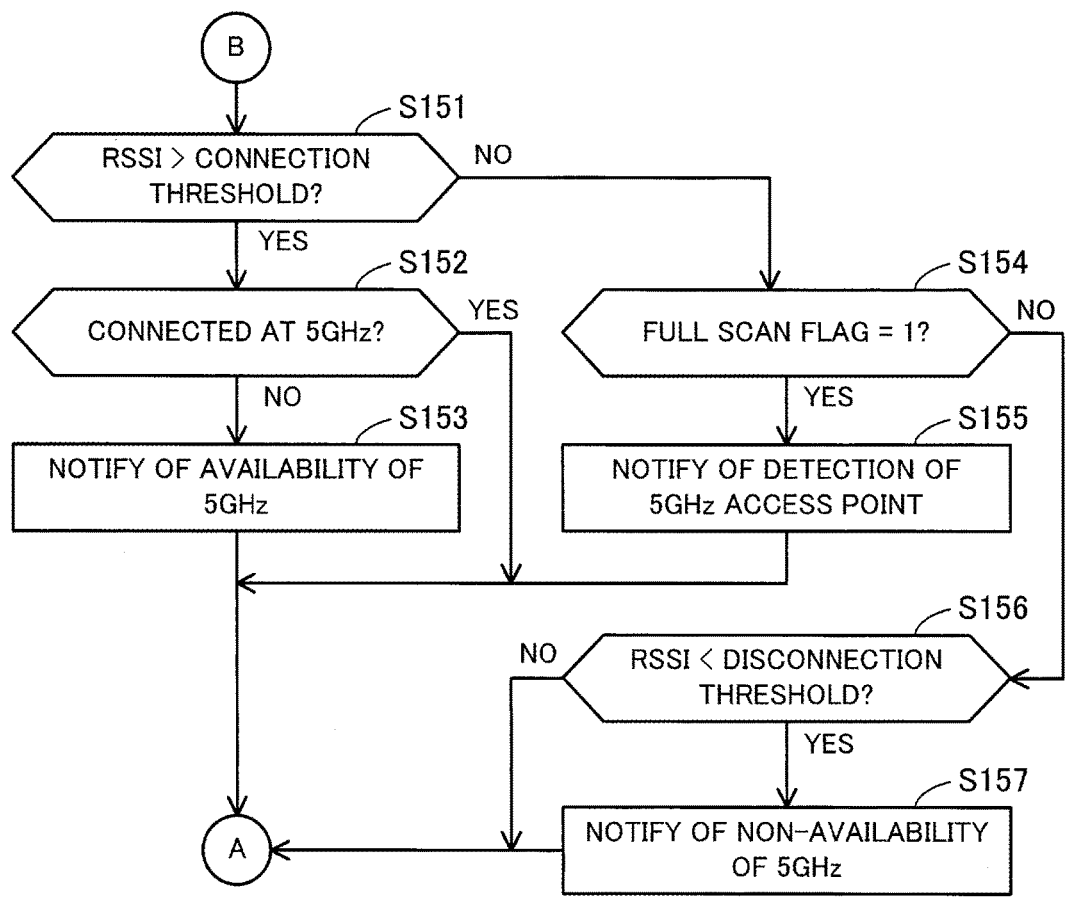

FIG. 15 is a flowchart (continued from FIG. 14) illustrating the example of the second process by the reception strength determination unit 121.

(S151) The reception strength determination unit 121 determines whether the RSSI measured by the radio communication unit 101 is greater than the connection threshold registered in the threshold table 112. If the measured RSSI is greater than the connection threshold, the process proceeds to step S152. If the measured RSSI is less than or equal to the connection threshold, the process proceeds to step S154. Note that in the second embodiment, although the connection threshold for the 2.4 GHz band and the connection threshold for the 5 GHz band are the same, these two connection thresholds may be different from each other. In this case, two connection thresholds are registered in the threshold table 112.

(S152) The reception strength determination unit 121 determines whether the mobile communication apparatus 100 is currently connected to any access point using the 5 GHz band (whether a connection is established in the 5 GHz band). If the connection is established in the 5 GHz band, the process by the reception strength determination unit 121 ends. If the connection is not established in the 5 GHz band, the process proceeds to step S153.

(S153) The reception strength determination unit 121 notifies the scan control unit 122 of the availability of 5 GHz. Then, the process by the reception strength determination unit 121 ends.

(S154) The reception strength determination unit 121 determines whether the full scan flag=1, that is, whether the radio communication unit 101 is executing a full 5 GHz scan. The full scan flag is updated in the above steps S132 and S133. If the full scan flag=1, the process proceeds to step S155. If the full scan flag=0, the process proceeds to step S156.

(S155) The reception strength determination unit 121 notifies the scan control unit 122 of a detection of a 5 GHz access point. Then, the process by the reception strength determination unit 121 ends.

(S156) The reception strength determination unit 121 determines whether the RSSI measured by the radio communication unit 101 is less than the disconnection threshold registered in the threshold table 112. If the measured RSSI is less than the disconnection threshold, the process proceeds to step S157. If the measured RSSI is greater than or equal to the disconnection threshold, the process by the reception strength determination unit 121 ends. Note that in the second embodiment, although the disconnection threshold for the 2.4 GHz band and the disconnection threshold for the 5 GHz band are the same, these two disconnection thresholds may be different from each other. In this case, two disconnection thresholds are registered in the threshold table 112.

(S157) The reception strength determination unit 121 notifies the scan control unit 122 of the non-availability of 5 GHz. Then, the process by the reception strength determination unit 121 ends.

Figure 16:
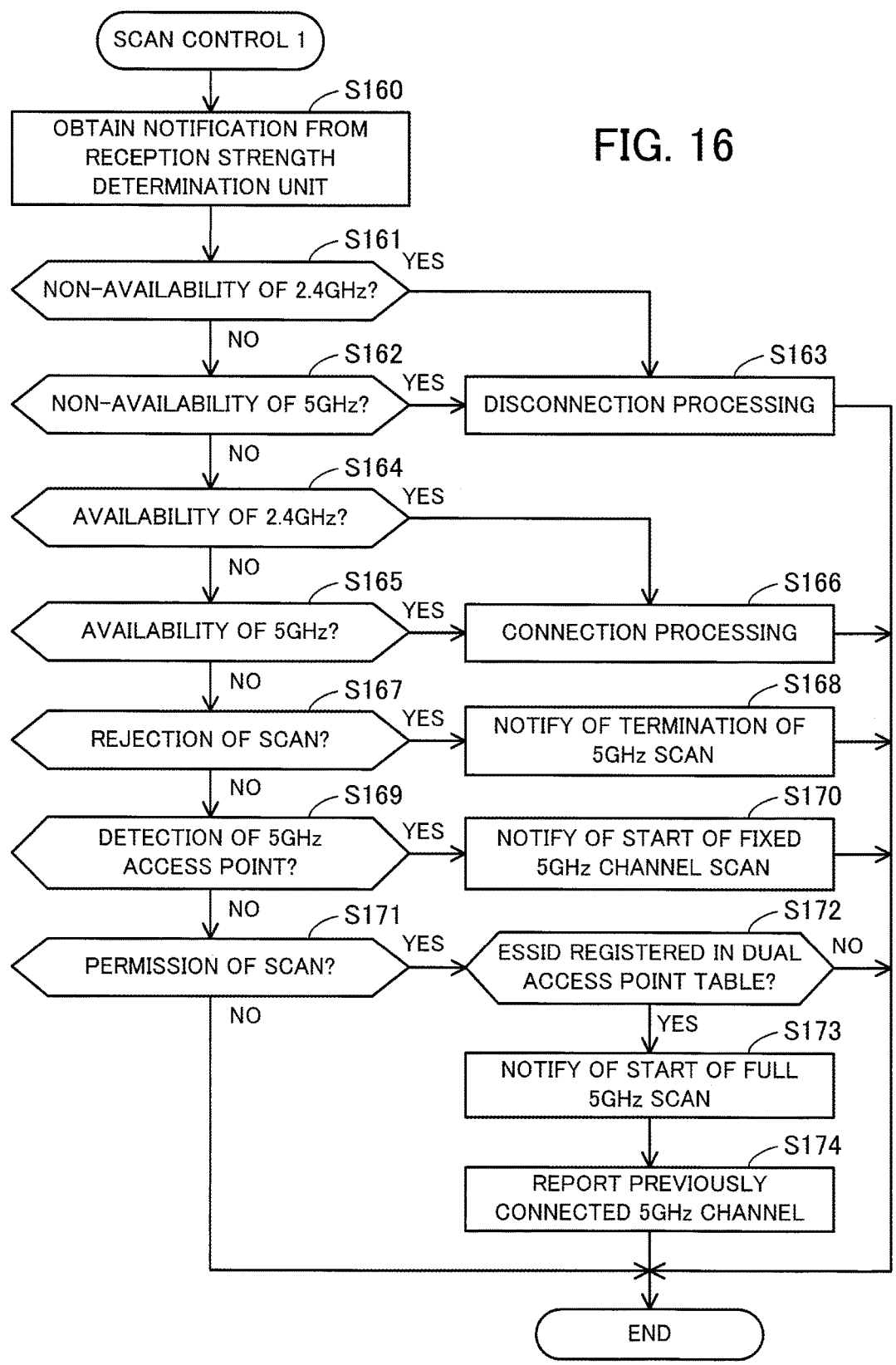
FIG. 16 is a flowchart illustrating an example of a first process by a scan control unit.

FIG. 16 is a flowchart illustrating an example of a first process by the scan control unit 122.

This process is performed by the reception strength determination unit 121 in accordance with a notification from the scan control unit 122.

(S160) The scan control unit 122 obtains a notification from the reception strength determination unit 121. Notifications that may be obtained in this step include the following notifications: the availability of 2.4 GHz; the non-availability of 2.4 GHz; permission of scan; rejection of scan; a detection of a 5 GHz access point; the availability of 5 GHz; and the non-availability of 5 GHz.

(S161) The scan control unit 122 determines whether the notification obtained in step S160 is a notification of the non-availability of 2.4 GHz. If a notification of the non-availability of 2.4 GHz is obtained, the process proceeds to step S163. If not, the process proceeds to step S162.

(S162) The scan control unit 122 determines whether the notification obtained in step S160 is a notification of the non-availability of 5 GHz. If a notification of the non-availability of 5 GHz is obtained, the process proceeds to step S163. If not, the process proceeds to step S164.

(S163) The scan control unit 122 instructs the radio communication unit 101 to perform disconnection processing. Thus, the currently established connection in the 2.4 GHz band or the 5 GHz band is terminated. Then, the process by the scan control unit 122 ends.

(S164) The scan control unit 122 determines whether the notification obtained in step S160 is a notification of the availability of 2.4 GHz. If a notification of the availability of 2.4 GHz is obtained, the process proceeds to step S166. If not, the process proceeds to step S165.

(S165) The scan control unit 122 determines whether the notification obtained in step S160 is a notification of the availability of 5 GHz. If a notification of the availability of 5 GHz is obtained, the process proceeds to step S166. If not, the process proceeds to step S167.

(S166) The scan control unit 122 instructs the radio communication unit 101 to perform connection processing. Thus, a connection to an access point detected in the 2.4 GHz band or the 5 GHz band is established. In the case of attempting to connect to an access point detected in the 5 GHz band when a connection to an access point has already been established in the 2.4 GHz band, the connection in the 2.4 GHz band is terminated first. Further, the scan control unit 122 registers the BSSID of the connected access point and a channel used for the connection in association with each other in the channel table 114. In the case where a predetermined maximum number of channel numbers or more channel numbers are already registered for the BSSID of the connected access point, the oldest channel number may be deleted. Then, the process by the scan control unit 122 ends.

(S167) The scan control unit 122 determines whether the notification obtained in step S160 is a notification of rejection of scan. If a notification of rejection of scan is obtained, the process proceeds to step S168. If not, the process proceeds to step S169.

(S168) The scan control unit 122 notifies the radio communication unit 101 and the reception strength determination unit 121 of termination of a 5 GHz scan. Thus, the full 5 GHz scan or the fixed 5 GHz channel scan is terminated. Then, the process by the scan control unit 122 ends.

(S169) The scan control unit 122 determines whether the notification obtained in step S160 is a notification of a detection of a 5 GHz access point. If a notification of a detection of a 5 GHz access point is obtained, the process proceeds to step S170. If not, the process proceeds to step S171.

(S170) The scan control unit 122 notifies the radio communication unit 101 and the reception strength determination unit 121 of start of a fixed 5 GHz channel scan. In this step, the scan control unit 122 reports a channel on which an access point is detected by the full 5 GHz scan to the radio communication unit 101. Then, the process by the scan control unit 122 ends.

(S171) The scan control unit 122 determines whether the notification obtained in step S160 is a notification of permission of scan. If a notification of permission of scan is obtained, the process proceeds to step S172. If not, the process by the scan control unit 122 ends.

(S172) The scan control unit 122 determines whether the ESSID for the 2.4 GHz band used by the currently connected access point is registered in the dual access point table 113. That is, the scan control unit 122 determines whether the currently connected access point is a dual-band access point. If the ESSID is registered, the process proceeds to step S173. If the ESSID is not registered, the process by the scan control unit 122 ends.

(S173) The scan control unit 122 notifies the radio communication unit 101 and the reception strength determination unit 121 of start of a full 5 GHz scan.

(S174) The scan control unit 122 searches the channel table 114 for a channel of the 5 GHz band corresponding to the BSSID for the 2.4 GHz band used by the currently connected access point. That is, the scan control unit 122 searches for a previously connected channel of the 5 GHz band, for the currently connected access point. Then, the scan control unit 122 reports the channel number of a channel detected by the search to the radio communication unit 101.

As illustrated in FIGS. 11 through 16, when the following three conditions are satisfied, the mobile communication apparatus 100 starts a scan of the 5 GHz band while performing communication using the 2.4 GHz band. (1) A connection is established on a channel of the 2.4 GHz band. (2) The RSSI of a received signal of the 2.4 GHz band which is received from the connected access point is greater than the scan threshold that is greater than the connection threshold. (3) The ESSID for the 2.4 GHz band used by the connected access point is registered as the ESSID of a dual-band access point.

Note that, when an access point is detected by a full 5 GHz scan (YES in the above step S169), a fixed 5 GHz channel scan may be performed only in the case where the access point detected in the 5 GHz band and the currently connected access point are the same access point. The determination as to whether the connected access point in the 2.4 GHz band and the access point detected in the 5 GHz band are the same access point may be made based on, for example, whether the ESSID of the former and the ESSID of the latter match. Alternatively, the determination may be made based on whether the ESSID of the former is registered in association with the ESSID of the latter in the dual access point table 113.

According to the mobile communication system of the second embodiment, a scan of the 5 GHz band is started when the following three conditions are satisfied: the mobile communication apparatus 100 is connected to the access point 11 in the 2.4 GHz band; the RSSI of the 2.4 GHz band is greater than the scan threshold that is greater than the connection threshold; and the connected access point 11 is a dual-band access point.

Thus, even if a connection to the access point 11 has already been established using the 2.4 GHz band, it is possible to detect the access point 11 by a scan of the 5 GHz band, and thus to have an opportunity to reconnect to the access point 11 using the 5 GHz band. Accordingly, even when the 5 GHz band has a smaller radio area than the 2.4 GHz band, it is possible to utilize the 5 GHz band.

Further, if the RSSI of the 2.4 GHz band is less than or equal to the scan threshold, the access point 11 is not likely to be detected in the 5 GHz band. On the other hand, if the RSSI of the 2.4 GHz band is greater than the scan threshold, the access point 11 is likely to be detected in the 5 GHz band. Thus, it is possible to start a scan of the 5 GHz band after the likelihood of the access point 11 being detected in the 5 GHz band is increased. Therefore, the load on the mobile communication apparatus 100 to perform a scan may be reduced. For example, it is possible to reduce the number of times the communication is suspended while the mobile communication apparatus 100 is communicating using the 2.4 GHz band.

Further, a scan of the 5 GHz band is started only in the case where the access point 11 connected in the 2.4 GHz band is a dual-band access point. Thus, it is possible to prevent a scan of the 5 GHz band from being performed when the 5 GHz band is not used. Furthermore, the scan may be continuously performed only in the case where the access point detected by a scan of the 5 GHz band matches the access point 11 connected in the 2.4 GHz band. Thus, it is possible to connect to an intended access point in the 5 GHz band as well.

(c) Third Embodiment

Next, a description will be given of a third embodiment. The following description focuses on the differences from the second embodiment. The same features as those of the second embodiment will not be described herein.

In the third embodiment, a radio interface of a mobile communication apparatus 100a is different from that of the mobile communication apparatus 100 of the second embodiment. The mobile communication system of the third embodiment may be implemented with the same system configuration as the mobile communication system of the second embodiment illustrated in FIG. 2. However, the mobile communication apparatus 100a described below is used in place of the mobile communication apparatus 100.

Figure 17:
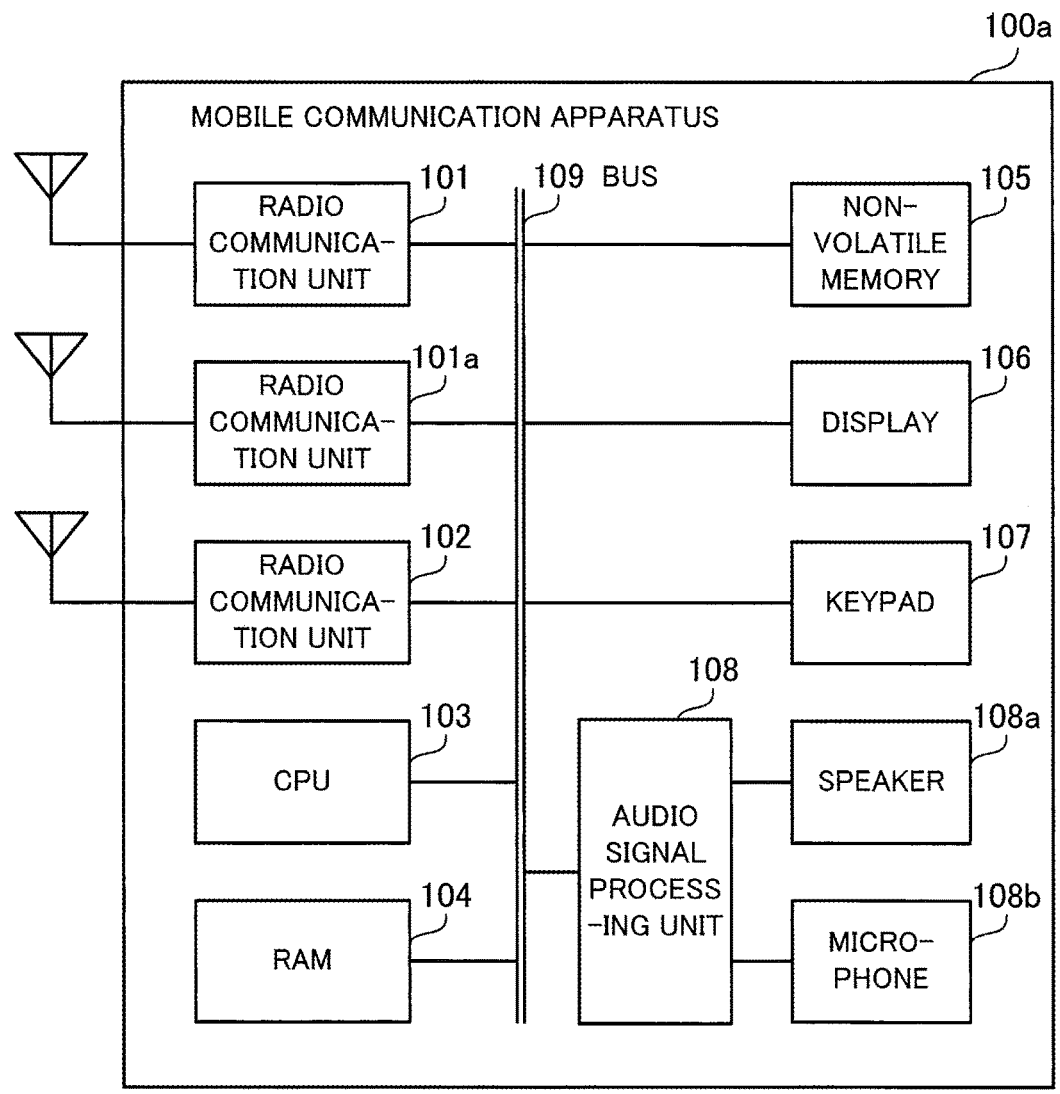
FIG. 17 is a block diagram illustrating an example of hardware of another mobile communication apparatus.

FIG. 17 is a block diagram illustrating an example of hardware of the mobile communication apparatus 100a.

The mobile communication apparatus 100a includes radio communication units 101, 101a, and 102, a CPU 103, a RAM 104, a non-volatile memory 105, a display 106, a keypad 107, an audio signal processing unit 108, a speaker 108a, a microphone 108b, and a bus 109.

Similar to the radio communication unit 101, the radio communication unit 101a is a radio interface that performs radio communication in accordance with the communication system of the wireless LAN 10. The radio communication unit 101a is able to scan for an access point in response to an instruction from the CPU 103. The radio communication unit 101 and the radio communication unit 101a are able to perform radio signal processing in parallel. The mobile communication apparatus 100a includes two pairs of a receiver and a transmitter for the wireless LAN 10. Accordingly, as will be described below, the mobile communication apparatus 100a is able to perform communication in the 2.4 GHz band and scan in the 5 GHz band in parallel.

Figure 18A:
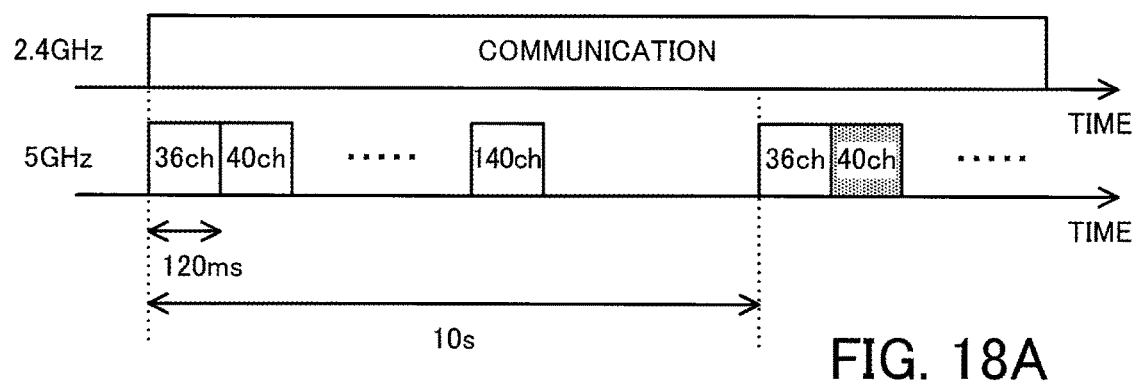
FIGS. 18A and 18B illustrate other examples of timing of scan of the 5 GHz band.
Figure 18B:
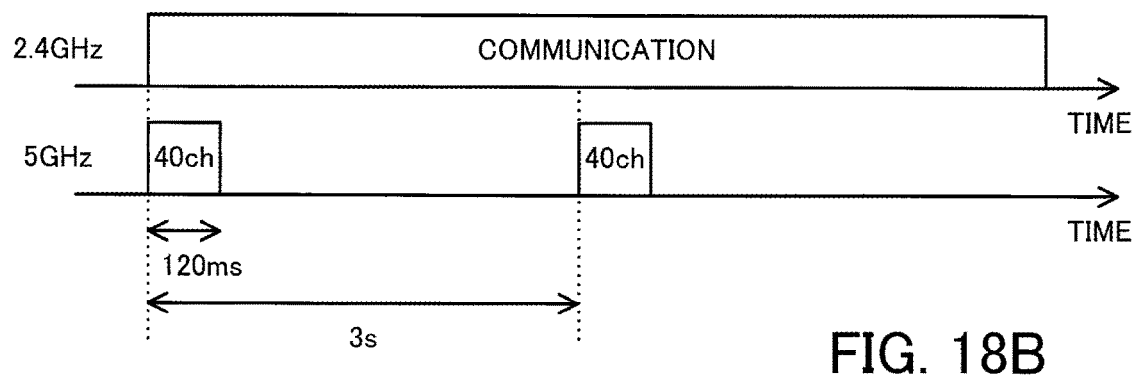

FIGS. 18A and 18B illustrate other examples of the timing of scan of the 5 GHz band.

The mobile communication apparatus 100a performs communication in the 2.4 GHz band using the radio communication unit 101, and performs scan in the 5 GHz band using the radio communication unit 101a. A receiver and a transmitter of the radio communication unit 101 are set to a frequency in the 2.4 GHz band, and a receiver of the radio communication unit 101a is set to a frequency in the 5 GHz band. Thus, it is possible to perform radio signal processing in different frequency bands in parallel. Accordingly, the mobile communication apparatus 100a is able to perform communication in the 2.4 GHz band and scan in the 5 GHz band in parallel without suspending the communication in the 2.4 GHz band.

In the full 5 GHz scan, the mobile communication apparatus 100a allocates a scan time of 120 milliseconds to each of the 19 channels of the 5 GHz band. The mobile communication apparatus 100a continuously performs a set of scans of 120 milliseconds×19 channels in the 5 GHz band. There is no need to provide a time interval between a scan and the next scan. If no access point is detected by the set of scans of 120 milliseconds×19 channels, the mobile communication apparatus 100a performs another set of scans after 10 seconds from the start of the previous set of scans. During this period, the mobile communication apparatus 100a is able to perform communication in the 2.4 GHz band without being affected by the scan of the 5 GHz band (that is, without suspending the communication).

In the fixed 5 GHz channel scan, the mobile communication apparatus 100a allocates a scan time of 120 milliseconds only to a channel (channel 40 in the examples of FIGS. 18A and 18B) on which an access point is detected by a full 5 GHz scan. The mobile communication apparatus 100a scans a specific channel in the 5 GHz band. In the case where an RSSI measured in the scan is not greater than the connection threshold, the mobile communication apparatus 100a scans the same channel again after 3 seconds from the start of the previous scan. During this period, the mobile communication apparatus 100a is able to perform communication in the 2.4 GHz band without being affected by the scan of the 5 GHz band (that is, without suspending the communication).

According to the mobile communication system of the third embodiment, the same effects as those in the second embodiment are obtained. Further, according to the third embodiment, since the mobile communication apparatus 100a includes two radio interfaces for the wireless LAN 10, it is possible to scan the 5 GHz band without suspending communication in the 2.4 GHz band. Thus, communication in the 2.4 GHz band may be less affected.

(d) Fourth Embodiment

Next, a description will be given of a fourth embodiment. The following description focuses on the differences from the second and third embodiments. The same features as those of the second and third embodiments will not be described herein.

In the second embodiment, ESSIDs of major dual-band access points are registered in advance in the dual access point table 113. On the other hand, in the fourth embodiment, the mobile communication apparatus 100 learns ESSIDs of dual-band access points, and dynamically updates the dual access point table 113.

The mobile communication system of the fourth embodiment may be implemented with the same system configuration as the mobile communication system of the second embodiment illustrated in FIG. 2. Further, the mobile communication apparatus 100 of the fourth embodiment may be implemented with the same configuration as the mobile communication apparatus 100 of the second embodiment illustrated in FIGS. 3 and 7. Accordingly, in the following, the fourth embodiment will be described using the same reference numbers as those used in FIGS. 2, 3, and 7.

First, a description will be given of a method (first learning method) for the mobile communication apparatus 100 to automatically detect a dual-band access point that uses different ESSIDs in the 2.4 GHz band and the 5 GHz band. The first learning method utilizes the characteristic that the area near the radio area of an access point in the 5 GHz band is covered by the radio area of the same access point in the 2.4 GHz band. When the RSSI of the 5 GHz band decreases and a connection in the 5 GHz band is terminated, the mobile communication apparatus 100 is likely to capture a radio signal from the same access point in the 2.4 GHz band and reconnect to the same access point in the 2.4 GHz band. Thus, the mobile communication apparatus 100 learns ESSIDs of a dual-band access point using the relationship between disconnection in the 5 GHz band and connection in the 2.4 GHz band.

FIG. 19 illustrates an example of a time information table 115.

The storage unit 110 of the mobile communication apparatus 100 further stores the time information table 115. The time information table 115 contains the fields for the ESSID for the 5 GHz band, the disconnection time in the 5 GHz band, the ESSID for the 2.4 GHz band, and the connection time in the 2.4 GHz band.

When a connection in the 5 GHz band is terminated, the mobile communication apparatus 100 registers the ESSID of the disconnected access point and the disconnection time in the time information table 115. Further, when a connection in the 2.4 GHz band is established, the mobile communication apparatus 100 registers the ESSID of the connected access point and the connection time in the time information table 115.

Then, the mobile communication apparatus 100 calculates the time difference between the disconnection time in the 5 GHz band, and the connection time of the connection in the 2.4 GHz band that occurred immediately after the disconnection in the 5 GHz band. If the calculated time difference is less than a predetermined value (for example, 30 seconds), the mobile communication apparatus 100 presumes that the ESSID for the 5 GHz band and the ESSID for the 2.4 GHz band indicate the same access point. In this case, the mobile communication apparatus 100 registers the ESSID in the dual access point table 113.

Figure 20:
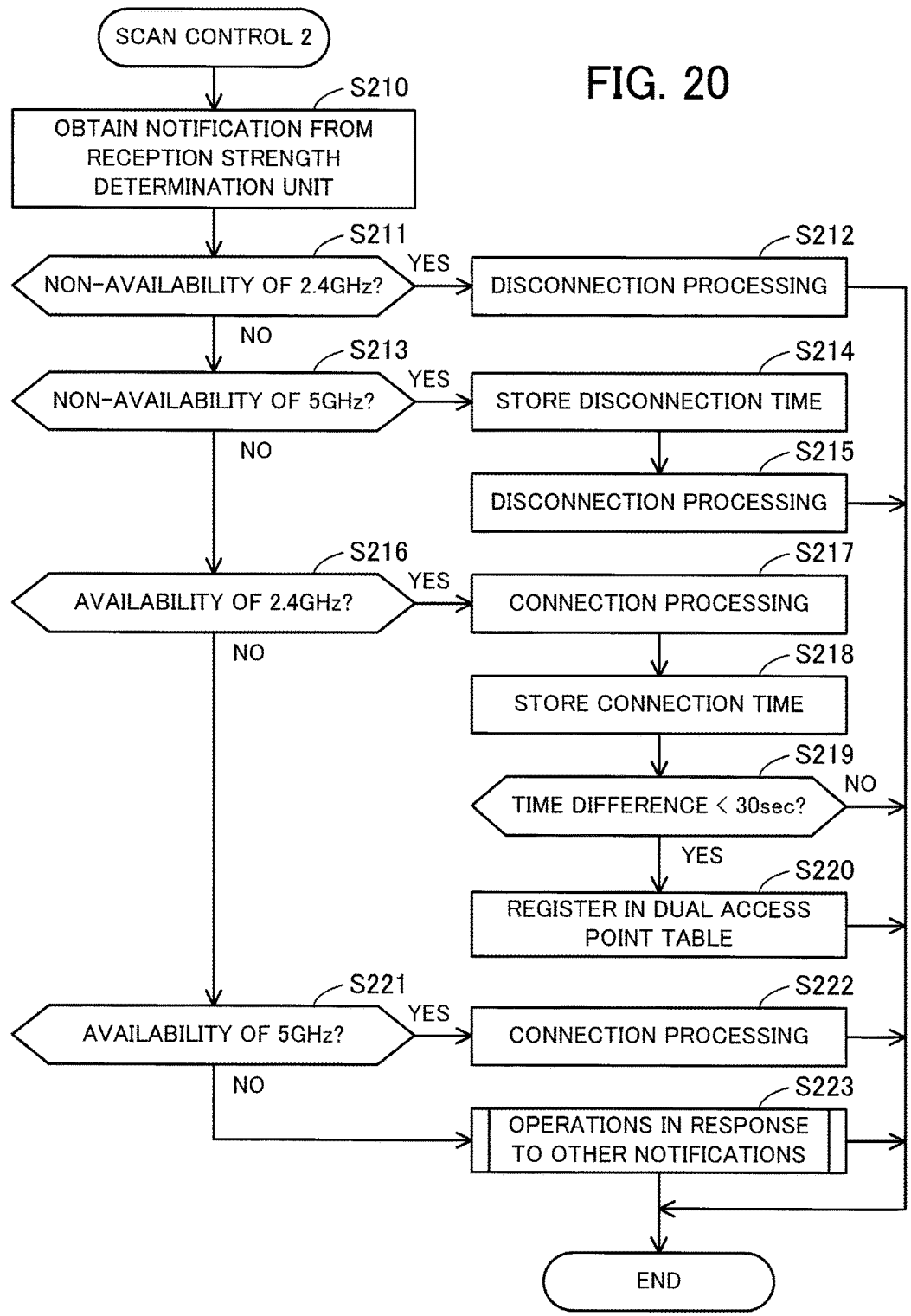
FIG. 20 is a flowchart illustrating an example of a second process by the scan control unit.

FIG. 20 is a flowchart illustrating an example of a second process by the scan control unit 122.

This process corresponds to the example of the first process by the scan control unit 122 illustrated in FIG. 16.

(S210) The scan control unit 122 obtains a notification from the reception strength determination unit 121.

(S211) The scan control unit 122 determines whether the notification obtained in step S210 is a notification of the non-availability of 2.4 GHz. If a notification of the non-availability of 2.4 GHz is obtained, the process proceeds to step S212. If not, the process proceeds to step S213.

(S212) The scan control unit 122 instructs the radio communication unit 101 to perform disconnection processing in the 2.4 GHz band. Thus, the currently established connection in the 2.4 GHz band is terminated. Then, the process by the scan control unit 122 ends.

(S213) The scan control unit 122 determines whether the notification obtained in step S160 is a notification of the non-availability of 5 GHz. If a notification of the non-availability of 5 GHz is obtained, the process proceeds to step S214. If not, the process proceeds to step S216.

(S214) The scan control unit 122 determines an ESSID for the 5 GHz band that is used by the access point connected in the 5 GHz band. Further, the scan control unit 122 determines the current time as disconnection time. Then, the scan control unit 122 registers the ESSID for the 5 GHz band and the disconnection time in the time information table 115.

(S215) The scan control unit 122 instructs the radio communication unit 101 to perform disconnection processing in the 5 GHz band. Thus, the currently established connection in the 5 GHz band is terminated. Then, the process by the scan control unit 122 ends.

(S216) The scan control unit 122 determines whether the notification obtained in step S160 is a notification of the availability of 2.4 GHz. If a notification of the availability of 2.4 GHz is obtained, the process proceeds to step S217. If not, the process proceeds to step S221.

(S217) The scan control unit 122 instructs the radio communication unit 101 to perform connection processing in the 2.4 GHz band. Thus, a connection to an access point detected in the 2.4 GHz band is established.

(S218) The scan control unit 122 determines an ESSID for the 2.4 GHz band that is used by the access point connected in step S217. Further, the scan control unit 122 determines the current time as connection time. Then, the scan control unit 122 registers the ESSID for the 2.4 GHz band and the connection time in the time information table 115.

(S219) The scan control unit 122 calculates the time difference between the most recent disconnection time in the 5 GHz band and the connection time registered in step S218. Then, the scan control unit 122 determines whether the calculated time difference is less than 30 seconds. If the time difference is less than 30 seconds, the process proceeds to step S220. If the time difference is greater than or equal to 30 seconds, the process by the scan control unit 122 ends. Note that the threshold (30 seconds mentioned above) for the time difference may be registered in the threshold table 112.

(S220) The scan control unit 122 presumes that the access point to which the immediately preceding connection in the 5 GHz is established and the access point newly connected in the 2.4 GHz band are the same access point (that is, a dual-band access point). Then, the scan control unit 122 registers the ESSID for the 5 GHz band and the ESSID for the 2.4 GHz band registered in the time information table 115, in association with each other in the dual access point table 113. Then, the process by the scan control unit 122 ends.

(S221) The scan control unit 122 determines whether the notification obtained in step S160 is a notification of the availability of 5 GHz. If a notification of the availability of 5 GHz is obtained, the process proceeds to step S222. If not, the process proceeds to step S223.

(S222) The scan control unit 122 instructs the radio communication unit 101 to perform connection processing in the 5 GHz band. Thus, a connection to an access point detected in the 5 GHz band is established. In the case of attempting to connect to an access point detected in the 5 GHz band when a connection to an access point has already been established in the 2.4 GHz band, the connection in the 2.4 GHz band is terminated first. That is, the frequency band to be used is switched from the 2.4 GHz band to the 5 GHz band. Then, the process by the scan control unit 122 ends.

(S223) Operations in response to other notifications (rejection of scan, a detection of a 5 GHz access point, and permission of scan) are the same as those in steps S167 through S174 of FIG. 16, and therefore not described herein.

Next, a description will be given of a method (second learning method) for the mobile communication apparatus 100 to automatically detect a dual-band access point that uses the same ESSID in the 2.4 GHz band and the 5 GHz band. According to the second learning method, the mobile communication apparatus 100 determines the scan status of the 2.4 GHz band when a connectable access point is detected in the 5 GHz band. Further, the mobile communication apparatus 100 determines the scan status of the 5 GHz band when a connectable access point is detected in the 2.4 GHz band. If the same ESSID is detected in the 2.4 GHz band and the 5 GHz band around the same time, the mobile communication apparatus 100 presumes that the ESSID is used by the same access point.

Figure 21:
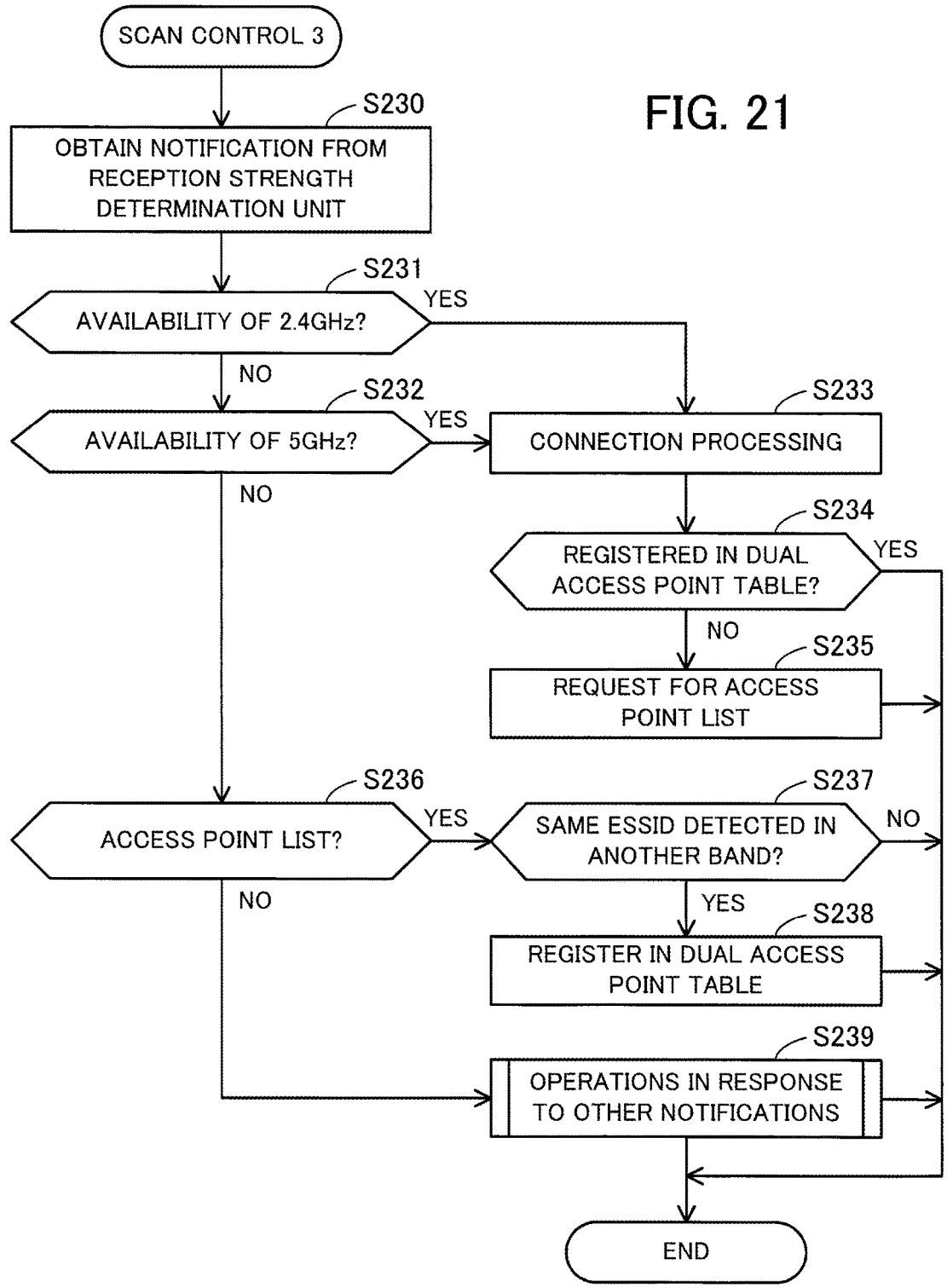
FIG. 21 is a flowchart illustrating an example of a third process by the scan control unit.

FIG. 21 is a flowchart illustrating an example of a third process by the scan control unit 122.

This process corresponds to the example of the first process by the scan control unit 122 illustrated in FIG. 16.

(S230) The scan control unit 122 obtains a notification from the reception strength determination unit 121. Notifications that may be obtained in this step include the following notifications: the availability of 2.4 GHz; the non-availability of 2.4 GHz; permission of scan; rejection of scan; a detection of a 5 GHz access point; the availability of 5 GHz; and the non-availability of 5 GHz. Further, as will be described below, notifications that may be obtained in this step include an "access point list".

(S231) The scan control unit 122 determines whether the notification obtained in step S230 is a notification of the availability of 2.4 GHz. If a notification of the availability of 2.4 GHz is obtained, the process proceeds to step S233. If not, the process proceeds to step S232.

(S232) The scan control unit 122 determines whether the notification obtained in step S230 is a notification of the availability of 5 GHz. If a notification of the availability of 5 GHz is obtained, the process proceeds to step S233. If not, the process proceeds to step S236.

(S233) The scan control unit 122 instructs the radio communication unit 101 to perform connection processing. Thus, a connection to an access point detected in the 2.4 GHz band or the 5 GHz band is established. In the case of attempting to connect to an access point detected in the 5 GHz band when a connection to an access point has already been established in the 2.4 GHz band, the connection in the 2.4 GHz band is terminated.

(S234) The scan control unit 122 determines whether the ESSID of the access point connected in step S233 is registered in the dual access point table 113. If the connection is established using the 2.4 GHz band, the ESSID of the connected access point is compared with items in the 2.4 GHz field in the dual access point table 113. If the connection is established using the 5 GHz band, the ESSID of the connected access point is compared with items in the 5 GHz field in the dual access point table 113. If the ESSID is registered in the dual access point table 113, the process by the scan control unit 122 ends. If the ESSID is not registered in the dual access point table 113, the process proceeds to step S235.

(S235) The scan control unit 122 requests the radio communication unit 101 for a list (access point list) of access points detected in the scan. The detected access points include those with RSSI less than or equal to the connection threshold and those not determined as candidate destinations. Then, the process by the scan control unit 122 ends.

(S236) The scan control unit 122 determines whether the notification obtained in step S230 is an access point list. If an access point list is obtained, the process proceeds to step S237. If not, the process proceeds to step S239.

(S237) The scan control unit 122 searches for the ESSID of the currently connected access point from the access point list that is obtained from the radio communication unit 101 via the reception strength determination unit 121. The scan control unit 122 determines whether the ESSID is detected in another frequency band that is different from the currently connected frequency band. If the connected frequency band is the 2.4 GHz band, the other frequency band is the 5 GHz band. If the connected frequency band is the 5 GHz band, the other frequency band is the 2.4 GHz band. If the ESSID is detected in the other frequency band, the process proceeds to step S238. If the ESSID is not detected, the process by the scan control unit 122 ends.

(S238) The scan control unit 122 registers the ESSID of the currently connected access point as the ESSID for the 2.4 GHz band and the 5 GHz band in the dual access point table 113. Then, the process by the scan control unit 122 ends.

(S239) Operations in response to other notifications (the non-availability of 2.4 GHz, the non-availability of 5 GHz, rejection of scan, a detection of a 5 GHz access point, and permission of scan) are the same as those in steps S161 through S163 and S167 through S174 of FIG. 16, and therefore not described herein.

Figure 22:
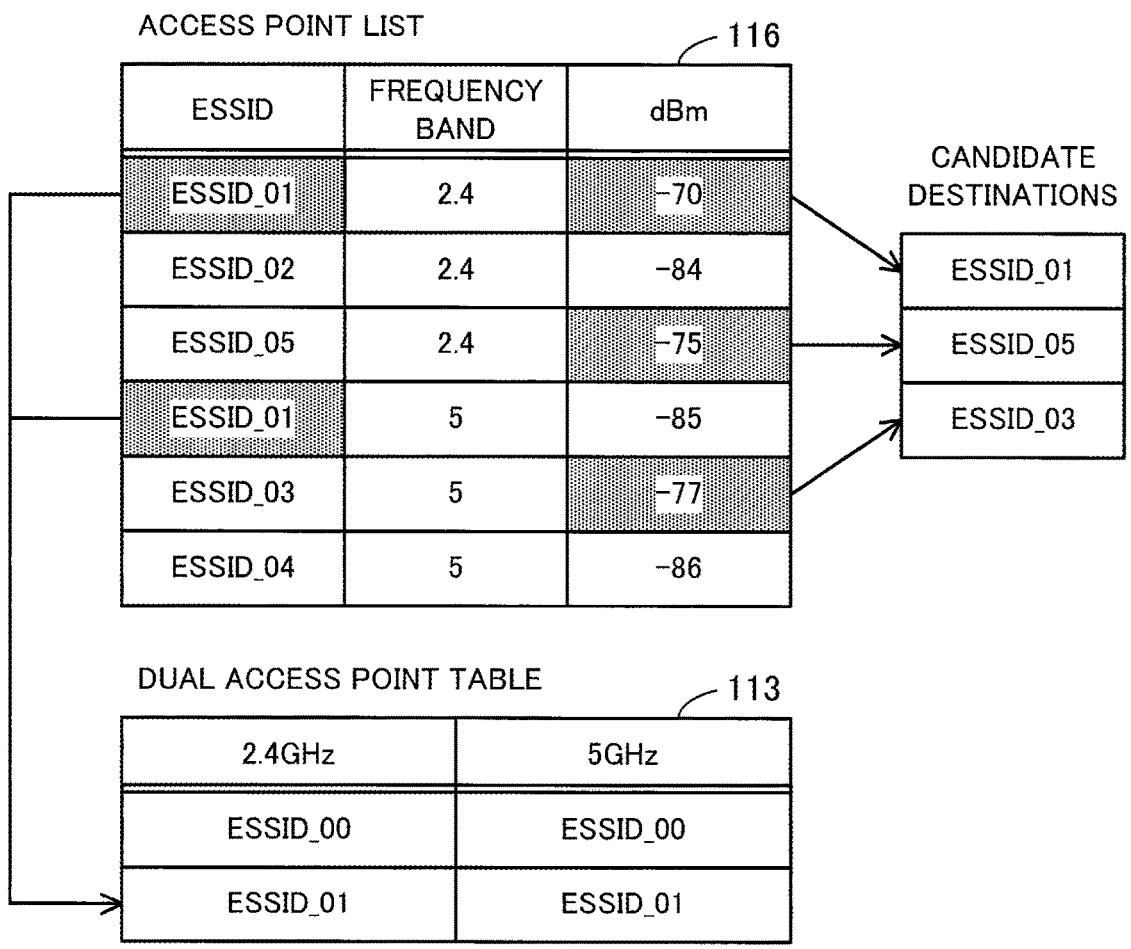
FIG. 22 illustrates an example of detection of a dual-band access point.

FIG. 22 illustrates an example of detection of a dual-band access point.

The scan control unit 122 obtains an access point list 116 from the radio communication unit 101 via the reception strength determination unit 121. The access point list 116 includes a list of records each including a detected ESSID, the frequency band in which the ESSID is detected, and a dBm value of the received signal in association with each other.

The access point list 116 also includes a list of ESSIDs of access points having a dBm value less than or equal to the connection threshold. On the other hand, the candidate destination displayed on the display 106 when the user instructs a scan is limited to the ESSID of an access point having a dBm value greater than the connection threshold. In the example of FIG. 22, ESSIDs of access points having dBm values greater than the connection threshold (−80 dBm) are ESSID_01 in the 2.4 GHz band, ESSID_05 in the 2.4 GHz band, and ESSID_03 in the 5 GHz band.

The scan control unit 122 extracts an ESSID detected in both the 2.4 GHz band and the 5 GHz band from the access point list 116. The ESSID extracted herein may be an ESSID of an access point having a dBm value less than or equal to the connection threshold. In the example of FIG. 22, ESSID_01 is detected in both the 2.4 GHz band and the 5 GHz band around the same time. Thus, the scan control unit 122 presumes that the access point using ESSID_01 is a dual-band access point, and registers ESSID_01 as an ESSID for the 2.4 GHz band and an ESSID for the 5 GHz band in the dual access point table 113.

According to the mobile communication system of the fourth embodiment, the same effects as those in the second embodiment are obtained. Further, in the fourth embodiment, the ESSIDs of dual-band access points are learned through radio communication. Therefore, even in the case where an own dual-band access point is installed at home or an office, it is possible to utilize radio resources in the 5 GHz band from the mobile communication apparatus 100.

As mentioned above, the processing of the first embodiment may be implemented by causing the mobile communication apparatus 1 to execute the communication control program. Further, the processing of the second through fourth embodiments may be implemented by causing the mobile communication apparatuses 100 and 100a to execute the communication control program.

The communication control program may be recorded in a computer-readable storage medium. Examples of storage media include magnetic disks, optical discs, magneto-optical disks, semiconductor memories, and the like. Magnetic disks include FD and HDD. Optical discs include CD, CD-Recordable (CD-R), CD-Rewritable (CD-RW), DVD, DVD-R, and DVD-RW. The communication control program may be stored in a portable storage medium and distributed. In this case, the communication control program may be copied from the portable storage medium to another storage medium (for example, the non-volatile memory 105) and executed.

According to one aspect, it is possible to efficiently perform switching to a frequency band different from a currently used frequency band.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mobile communication apparatus comprising:
   a radio interface configured to perform communication using a first frequency band or a second frequency band;
   a memory configured to store access point information indicating one or more access points that use the first frequency band and the second frequency band; and
   a processor configured to perform a procedure including:
   allowing a connection to one access point in the first frequency band when a signal level of a received signal of the first frequency band which is received from the one access point exceeds a first threshold, and
   starting a search for an access point in the second frequency band when the connection to the one access point in the first frequency band is established, when the signal level exceeds a second threshold greater than the first threshold, and when the one access point corresponds to any of the one or more access points indicated by the access point information,
   wherein when the connection in the first frequency is established within a predetermined period of time from termination of a previous connection in the second frequency band, the processor determines that a destination of the connection in the first frequency band and a destination of the connection in the second frequency band are a same access point, and registers the same access point in the access point information.

2. The mobile communication apparatus according to claim 1, wherein when the one access point is detected in the second frequency band, the processor allows a frequency band that is used for the connection to the one access point to be switched from the first frequency band to the second frequency band.

3. The mobile communication apparatus according to claim 1, wherein the second frequency band includes a higher frequency than the first frequency band.

4. A radio communication method comprising:
   determining, by a mobile communication apparatus when a connection in a first frequency is established within a predetermined period of time from termination of a previous connection in a second frequency band, that a destination of the connection in the first frequency band and a destination of the connection in the second frequency band are a same access point, and registering the same access point in access point information, the access point information indicating one or more access points that use the first frequency band and the second frequency band;
   allowing, by the mobile communication apparatus, a connection to one access point in the first frequency band when a signal level of a received signal of the first frequency band which is received from the one access point exceeds a first threshold; and
   starting, by the mobile communication apparatus, a search for an access point in the second frequency band when the connection to the one access point in the first frequency band is established, when the signal level exceeds a second threshold greater than the first threshold, and when the one access point corresponds to any of the one or more access points indicated by the access point information.

5. A non-transitory computer-readable storage medium storing a computer program that causes a computer included in a mobile communication apparatus to perform a procedure comprising:
   determining, when a connection in a first frequency is established within a predetermined period of time from termination of a previous connection in a second frequency band, that a destination of the connection in the first frequency band and a destination of the connection in the second frequency band are a same access point, and registering the same access point in access point information, the access point information indicating one or more access points that use the first frequency band and the second frequency band;
   allowing a connection to one access point in the first frequency band when a signal level of a received signal of the first frequency band which is received from the one access point exceeds a first threshold; and
   starting a search for an access point in the second frequency band when the connection to the one access point in the first frequency band is established, when the signal level exceeds a second threshold greater than the first threshold, and when the one access point corresponds to any of the one or more access points indicated by the access point information.

\* \* \* \* \*